United States Patent
Huang et al.

(10) Patent No.: US 9,412,017 B1
(45) Date of Patent: Aug. 9, 2016

(54) METHODS SYSTEMS AND COMPUTER PROGRAM PRODUCTS FOR MOTION INITIATED DOCUMENT CAPTURE

(71) Applicant: Intuit Inc., Mountain View, CA (US)

(72) Inventors: Nankun Huang, San Diego, CA (US); Carol Howe, San Diego, CA (US); Christopher M. Dye, San Diego, CA (US); Robert E. Bamford, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 147 days.

(21) Appl. No.: 14/144,354

(22) Filed: Dec. 30, 2013

(51) Int. Cl.
*G06K 9/00* (2006.01)
(52) U.S. Cl.
CPC .................. *G06K 9/00449* (2013.01)
(58) Field of Classification Search
None
See application file for complete search history.

(56) References Cited

U.S. PATENT DOCUMENTS

| | | | |
|---|---|---|---|
| 5,787,194 A | 7/1998 | Yair | |
| 7,046,401 B2* | 5/2006 | Dufaux | G06K 9/20 358/450 |
| 7,505,178 B2 | 3/2009 | Erol et al. | |
| 7,747,484 B2 | 6/2010 | Stanley | |
| 7,844,915 B2 | 11/2010 | Platzer et al. | |
| 7,930,226 B1* | 4/2011 | Quinn | G06Q 10/10 705/31 |
| 8,156,018 B1 | 4/2012 | Quinn et al. | |
| 8,589,262 B1 | 11/2013 | Wang | |
| 8,606,665 B1 | 12/2013 | Shaw | |
| 8,793,574 B2 | 7/2014 | Curtis | |
| 8,908,237 B2* | 12/2014 | Revelin | G06K 9/00 358/1.2 |
| 2001/0049274 A1 | 12/2001 | Degraeve | |
| 2005/0010780 A1 | 1/2005 | Kane et al. | |
| 2006/0107312 A1 | 5/2006 | Fiske | |
| 2006/0178961 A1 | 8/2006 | Stanley et al. | |
| 2006/0271451 A1 | 11/2006 | Varughese | |
| 2007/0033118 A1 | 2/2007 | Hopkinson | |

(Continued)

FOREIGN PATENT DOCUMENTS

| | | |
|---|---|---|
| JP | 2003006556 | 1/2003 |
| JP | 2003006556 A | 1/2003 |

(Continued)

OTHER PUBLICATIONS http://en.wikipedia.org/wiki/Photo_Booth, printed Dec. 27, 2013 (4 pages).

(Continued)

*Primary Examiner* — Wesley Tucker
(74) *Attorney, Agent, or Firm* — Vista IP Law Group LLP

(57) ABSTRACT

A computing device acquires a video of a tax document utilizing a video camera such as a webcam. The video is analyzed to detect a first motion of the tax document, such as sufficient shaking or movement of the tax document, satisfying first pre-determined criteria that results in the computing device being prompted or requested by the user to take an image of the tax document. After the first pre-determined criteria has been satisfied, the user is instructed to hold the tax document steady. Subsequent video frames are analyzed to detect a second motion or the tax document being sufficiently still or steady, in response to which an image of the tax document is acquired and processed to extract data of the tax document from the acquired image and populate corresponding fields of the electronic tax return.

51 Claims, 19 Drawing Sheets

(56) References Cited

U.S. PATENT DOCUMENTS

| | | | |
|---|---|---|---|
| 2008/0319882 A1* | 12/2008 | Wyle | G06F 17/243 705/31 |
| 2009/0070207 A1 | 3/2009 | Engel et al. | |
| 2009/0228380 A1* | 9/2009 | Evanitsky | G06Q 40/123 705/31 |
| 2010/0161460 A1 | 6/2010 | Vroom et al. | |
| 2011/0219427 A1 | 9/2011 | Hito et al. | |
| 2012/0194837 A1 | 8/2012 | Kamata | |
| 2012/0215669 A1 | 8/2012 | Lieberman | |
| 2013/0036347 A1* | 2/2013 | Eftekhari | G06Q 40/00 715/222 |
| 2013/0173915 A1 | 7/2013 | Haulund | |
| 2014/0244455 A1 | 8/2014 | Huang et al. | |
| 2014/0244456 A1 | 8/2014 | Huang et al. | |
| 2015/0019413 A1 | 1/2015 | Lazarus | |

FOREIGN PATENT DOCUMENTS

| | | |
|---|---|---|
| JP | 2004145663 | 5/2004 |
| JP | 2006133933 | 5/2006 |
| JP | 2006133933 A | 5/2006 |
| JP | 2010128964 | 6/2010 |
| JP | 2010128964 A | 6/2010 |
| KR | 100883390 | 2/2009 |
| KR | 1020090064267 | 6/2009 |
| KR | 1020090064267 A | 6/2009 |
| WO | 2012137214 | 10/2012 |

OTHER PUBLICATIONS http://en.wikipedia.org/wiki/Computer_vision, printed Dec. 27, 2013 (10 pages).
http://en.wikipedia.org/wiki/Webcam, printed Dec. 27, 2013 (10 pages).
http://en.wikipedia.org/wiki/Lucas%Er/080°093Kanade_method, printed Dec. 27, 2013 (4 pages).
https://turbotax.intuit.com/, printed Dec. 27, 2013 (6 pages).
http://en.wikipedia.org/wiki/Hough_transform, printed Dec. 30, 2013 (11 pages).
PCT Written Opinion dated Nov. 22, 2013 in International Application No. PCT/US2013/040647 filed May 10, 2013, Form ISA 237, (6 pages).
Office Action dated Feb. 4, 2014 in U.S. Appl. No. 13/781,571, filed Feb. 28, 2013, (8 pages).
PCT International Search Report dated Nov. 27, 2013 in International Application No. PCT/US2013/040628 filed May 10, 2013, Form ISA 220 and 210, (5 pages).
PCT Written Opinion dated Nov. 27, 2013 in International Application No. PCT/US2013/040628 filed May 10, 2013, Form ISA 237, (7 pages).
PCT International Search Report dated Nov. 22, 2013 in International Application No. PCT/US2013/040647 filed May 10, 2013, Form ISA 220 and 210, (5 pages).
PCT Written Opinion dated Nov. 22, 2013 in International Application No. PCT/US2013/040647 filed May 10, 2013, Form ISA 237, (8 pages).
PCT International Search Report dated Dec. 19, 2013 in International Application No. PCT/US2013/040620 filed May 10, 2013, Form ISA 220 and 210, (6 pages).
PCT Written Opinion dated Dec. 19, 2013 in International Application No. PCT/US2013/040620 filed May 10, 2013, Form ISA 237, (13 pages).
Amendment filed May 5, 2014 in U.S. Appl. No. 13/781,571, filed Feb. 28, 2013, (17 pages).
Restriction Requirement dated Apr. 2, 2015 in U.S. Appl. No. 13/781,540, filed Feb. 28, 2013, (7pages).
Non-Final Office Action dated Dec. 2, 2014 in U.S. Appl. No. 13/781,571, filed Feb. 28, 2013, (17pages).
Response to Non-Final Office Action dated Apr. 2, 2015 in U.S. Appl. No. 13/781,571, filed Feb. 28, 2013, (25pages).
Non-Final Office Action dated Apr. 16, 2015 in U.S. Appl. No. 13/781,540, filed Feb. 28, 2013, (39pages).
Amendment dated Jul. 16, 2015 in U.S. Appl. No. 13/781,540, filed Feb. 28, 2013, (31pages).
Final Office Action dated Jun. 10, 2015 in U.S. Appl. No. 13/781,571, filed Feb. 28, 2013, (27pages).
PCT International Preliminary Report on Patentability (Chapter I of the Patent Cooperation Treaty) for PCT/US2013/040628, Applicant: Intuit Inc., Form PCT/IB/326 and 373, dated Sep. 11, 2015 (9pp).
Final Office Action dated Sep. 3, 2015 in U.S. Appl. No. 13/781,540, filed Feb. 28, 2013, (17pp).
PCT International Preliminary Report on Patentability (Chapter I of the Patent Cooperation Treaty) for PCT/US2013/040647, Applicant: Intuit Inc, Form PCT/IB/326 and 373, dated Sep. 11, 2015 (11pp).
PCT International Preliminary Report on Patentability (Chapter I of the Patent Cooperation Treaty) for PCT/US2013/040620, Applicant: Intuit Inc, Form PCT/IB/326 and 373, dated Sep. 11, 2015 (15pp).
Amendment and Response dated Oct. 12, 2015 in U.S. Appl. No. 13/781,571, filed Feb. 28, 2013, (57pp).
Amendment dated Aug. 28, 2015 in U.S. Appl. No. 13/781,393, filed Feb. 28, 2013, (26pp).
Notice of Allowance dated Oct. 5, 2015 in U.S. Appl. No. 13/781,393, filed Feb. 28, 2013, (14pp).
Request for Continued Examination dated Apr. 2, 2015 in U.S. Appl. No. 13/781,393, filed Feb. 28, 2013, (11pages).
Non-Final Office Action dated May 28, 2015 in U.S. Appl. No. 13/781,393, filed Feb. 28, 2013, (13pages).
Notice of Allowance dated Mar. 27, 2015 in U.S. Appl. No. 13/781,393 filed Feb. 28, 2013, (14pages).
Non-Final Office Action dated Oct. 3, 2014 in U.S. Appl. No. 13/781,393, filed Feb. 28, 2013, (22pages).
Office Action dated Oct. 3, 2014 in U.S. Appl. No. 13/781,393, filed Feb. 28, 2013, (8 pages).
Amendment dated Jan. 5, 2015 in U.S. Appl. No. 13/781,393, filed Feb. 28, 2013, (8pages).
Response to Restriction Requirement dated Apr. 2, 2015 in U.S. Appl. No. 13/781,540, (8pages).
Restriction Requirement dated Aug. 16, 2013 in U.S. Appl. No. 13/781,571, (7pages).
Response to Restriction Requirement dated Oct. 16, 2013 in U.S. Appl. No. 13/781,571, (10pages).
http://support.google.com/drive/bin/answer.py?hl=en&answer=176692, printed: Mar. 18, 2013 (2pgs.).
http://www.nuance.com/for-individuals/by-product/omnipage/index.htm, printed: Mar. 18, 2013, (2pgs.).
http://www.miteksystems.com/, printed: Mar. 18, 2013, (3pgs.).
http://www.abbyy.com/solutions/mobile/, printed: Mar. 18, 2013, (1pg.).
http://blog.turbotax.intuit.com/2011/01/14/taxes-on-your-mobile-phone-it%E2%80%99s-a-snap/, printed: Mar. 18, 2013, (2pgs.).
http://www.apple.com/osx/what-is/gestures.html#gallery-gestures-tap-zoom, printed: Mar. 18, 2013, (3pgs.).
http://oauth.net/, printed: Mar. 18, 2013, (1pg.).
http://en.wikipedia.org/wiki/OAuth, printed: Mar. 18, 2013, (9pgs.).
Response dated Dec. 3, 2015 in U.S. Appl. No. 13/781,540, filed Feb. 28, 2013, (42pgs.).

* cited by examiner (DOCUMENT DETECT)

(USER MOVES DOCUMENT TO PROMPT IMAGE CAPTURE)

FIG. 13

METHODS SYSTEMS AND COMPUTER PROGRAM PRODUCTS FOR MOTION INITIATED DOCUMENT CAPTURE

SUMMARY

Certain embodiments are directed to acquiring a video of a tax document, acquiring an image of the tax document based at least in part upon tax document motion in the video, and processing the image to determine data in the tax document image for an electronic tax return.

Certain embodiments are directed to detecting sufficient motion of a tax document within a video to trigger or prompt a computing device to acquire an image of the tax document.

Certain embodiments are directed to detection of different motions for initially prompting a computing device to acquire an image of a document and subsequently acquiring the image. For example, certain embodiments are directed to detecting when a user shakes or moves a tax document in view of a video camera such as a webcam to prompt a computing device to acquire an image of the tax document and then acquiring the image when the user is no longer shaking or moving the tax document or when the tax document is sufficiently steady for image processing such as optical character recognition.

Embodiments are directed to video-based recognition of a tax document for use in motion-based image acquisition. For example, certain embodiments are directed to initially determining whether an object in view of a video camera is a tax document. If so, motion or shaking of the tax document prompts the computing device for eventual acquisition of an image of the tax document when the tax document is sufficiently steady. If not, then the computing device is not prompted for image acquisition and may instruct the user to position a tax document in view of the video camera for processing.

Certain embodiments are directed to detecting tax document motion or a user's gesture expressed by moving the tax document within a video to trigger tax document image acquisition and redacting at least a portion of the acquired image, e.g., using facial recognition. For example, an image that is acquired may include the tax document and a user's face. The user's face can be recognized or selected and redacted from the image such that the redacted image is then subsequently processed.

Certain embodiments are also directed to generating or taking videos of tax documents, processing of images or frames thereof to determine tax document data and importing determined tax document data into respective fields of an electronic tax return or interview screen generated by a tax return preparation application used to prepare the electronic tax return. For example, electronic tax returns can be prepared using only motion-based tax document image acquisition, and one or more images are processed such that a user is not required to manually input data by use of a data input device such as a touchscreen keyboard, mechanical keyboard or a mouse that is recognized from the acquired image. In these embodiments, for example, a user may shake a first tax document in view of a video camera to prompt image acquisition, then hold the first tax document steady so that a first image can be acquired and processed, and when the first tax document processing has been completed, repeat the process for other tax documents. Thus, embodiments allow for "touchless" tax return preparation experience in which the user holds documents in view of a video camera rather than traditional tax return data entry involving "touching" a keyboard or touchscreen to manually enter tax return data and initiates image capture and data processing and importation by shaking the tax document. Thus, an electronic tax return can be initiated, prepared, completed and filed with a tax authority by taking a video of tax documents and processing same according to embodiment. Embodiments can also be utilized in conjunction with automatic transfer of data from a prior year electronic tax return and automatic import from an electronic file of a financial management system. Electronic tax returns can also be prepared by using a combination of motion-based image acquisition and traditional manual data entry such that embodiments can be employed to reduce the amount of tax return data that is manually entered.

Certain embodiments are directed to prompting or directing a user regarding when to move a tax document to request acquisition of an image of an image of a tax document and when to hold a tax document steady for image acquisition.

Certain embodiments are directed to monitoring whether a user holds a document steady for a sufficient time, and directing a user to hold the document steady if it is determined that the document is not sufficiently steady.

One embodiment is directed to a machine or computer implemented method for determining data of a tax document and that is performed by a computing device. The method comprises the computing device acquiring a video utilizing a video camera and detecting first motion of the tax document in the video. The computing device is prompted or requested to acquire an image of the tax document in view of the video camera based at least in part upon detection of the first motion satisfying first pre-determined criteria. Second tax document motion within the acquired video is detected, and the computing device is triggered to acquire an image of the tax document based at least in part upon the second motion satisfying second pre-determined criteria different from the first pre-determined criteria. The acquired image is processed to determine or extract tax document data from the image.

Another embodiment is directed to a machine or computer implemented method for determining data of a tax document and comprises a computing device acquiring a video of an object held by a user of the computing device in front of a video camera of the computing device and determining whether the object is a tax document. If so, the computing device acquires a video of the object or tax document utilizing a video camera, detects first motion of the tax document in the video in the form of shaking or movement of the tax document such that the computing device is then prompted to acquire an image of the tax document when the detected shaking or movement satisfies first pre-determined criteria. The computing device then analyzes the video to detect second motion, or reduction of motion relative to the first motion, in the form of the tax document being held or maintained substantially steady. Given the very low likelihood that a user can hold the tax document perfectly still such that no part of the tax document moves at all, second motion or lack of or reduction of motion relative to the first motion and following satisfaction of the first pre-determined criteria is used to trigger image acquisition. An image of the tax document is acquired after the tax document is maintained substantially steady for a pre-determined minimum time, and the acquired image is processed to extract tax document data.

Yet another embodiment is directed to a machine or computer implemented method for preparing an electronic tax return. The method comprises a computing device that executes a tax return preparation application operable to prepare the electronic tax return acquiring a video utilizing a video camera and detecting first motion of the tax document in the video satisfying first pre-determined criteria. The method further comprises detecting second tax document motion in the video and acquiring an image of the tax document based at least in part upon the second motion satisfying second pre-determined criteria different from the first pre-determined criteria. The method further comprises processing the acquired image to extract data of the tax document from the acquired image and import extracted data into the electronic tax return. According to embodiments, the electronic tax return can be at least partially prepared or completed without the user manually inputting electronic tax return data into a touchscreen or keyboard of the computing device, thus providing for a video-based "touchless" tax return preparation experience.

A further embodiment is directed to a machine or computer implemented method for video-based preparation of an electronic tax return by a computing device executing a tax return preparation application operable to prepare the electronic tax return and comprises acquiring videos of tax documents utilizing a video camera and acquiring an image of each tax document based at least in part upon respective motions or movements of respective tax documents in the videos. The method further comprises processing images to extract respective tax document data from respective images and to determine respective fields of the electronic tax return that should be populated with extracted data. The method further comprises importing respective extracted data into respective fields of the electronic tax return, wherein the electronic tax return is completed using respective tax document data extracted from respective images without the user manually inputting any electronic tax return data into the electronic tax return data.

Another embodiment is directed to a machine or computer implemented method for video-based preparation of an electronic tax return. The method is performed by a computing device executing a tax return preparation application operable to prepare the electronic tax return and comprises extracting data from an image of a tax document acquired by the computing device in response to the computing device detecting motion of the tax document in view of a video camera of the computing device and importing respective extracted data into respective fields of the electronic tax return.

Further embodiments are directed to systems configured or operable to determine data of a tax document or video-based preparation of an electronic tax return. System embodiments may comprise components of a computing device and/or components of a tax preparation application or detection module accessed thereby. For example, certain embodiments may involve or comprise a webcam or other video camera of or utilized by a computing device such as a desktop computer, laptop computer or tablet computing device. System embodiments comprise or involve a controller, such as a microcontroller or processor of the computing device or an engine or controller of the tax preparation application, which executes or is in communication with one or more modules or components configured or operable to detect first motion or shake or movement of the tax document to prompt the controller to acquire an image, detect a second motion, or a change from the first motion, such that when the tax document is sufficiently steady, the video camera or other image acquisition device is activated or triggered to acquire an image of the tax document. System embodiments also include modules configured or operable to detect whether an object in view of the video camera is a tax document, detect document motion within a video frame(s), and a timer, which may count how long the tax document must be held steady before the image is acquired. Embodiments may also include recognition or computer vision components, which are operable to analyze the acquired image and determine or extract data of the imaged tax document, which may then be imported into respective fields of an electronic tax return or interview screen of the tax preparation application utilized to prepare the electronic tax return.

Further embodiments are directed to computer program products or articles of manufacture comprising a non-transitory computer readable medium tangibly embodying one or more sequences of instructions which, when executed by one or more processors of a machine or computing device causes the machine or computing device to execute processes for detecting motion of a tax document within a video, acquiring an image of a tax document based at least in part upon detected motion, determining data of a tax document, and preparing at least a portion of an electronic tax return based on data determined from the imaged tax document.

In a single or multiple embodiments, detected motion is motion of the tax document within the video or frames thereof, and is determined by the computing device analyzing frames or groups of frames of the video. For example, respective positions of the tax document within respective frames may be identified, and a first motion of the tax document may be detected based at least in part upon respective different detected positions of respective tax document images in respective frames and determining whether the motion or movement of the tax document as reflected in video frames satisfies the first pre-determined criteria of a pre-determined minimum motion. For example, the pre-determined minimum motion may be a minimum amount of shaking of the tax document. For example, in one embodiment, detection of the first motion (and/or the second motion or change relative to the first motion) is based at least in part upon respective optical flows representative of respective positions and apparent motions of the tax document within respective frames of the video. Utilizing an optical flow estimator such as a Lucas-Kanade optical flow estimator, data of an attribute of a first optical flow as determined by the Lucas-Kanade optical flow estimator and a first pre-determined value are compared to determine whether the first pre-determined criteria is satisfied, and data of an attribute of a second optical flow as determined by the Lucas-Kanade optical flow estimator and a second pre-determined value are compared to determine whether the second pre-determined criteria is satisfied.

For example, when the user sufficiently shakes or moves the tax document in view of the video camera, the resulting optical flow results in the first pre-determined criteria is satisfied to prompt the computing device to eventually acquire an image, whereas the second pre-determined criteria is satisfied when the shaking or movement ceases or is reduced by an amount or degree such that the tax document is steady or substantially steady for a pre-determined minimum time as determined by a timer to allow data of the imaged tax document to be recognized by computer vision. The second motion in the form of the tax document being steady or substantially steady may be independent of or relative to the first motion. For example, the second motion may be based on a magnitude of motion (i.e., second pre-determined criteria may require a low level of motion), or based on a difference between the shaking and steady states.

In one or more embodiments, the count of the timer (e.g., a countdown), is displayed to the user to inform the user how long the tax document should be held steady before an image is acquired. If the user shakes, or does not hold the document steady for the pre-determined time during the count such that the second pre-determined criteria is no longer satisfied, the computing device can interrupt the timer and instruct the user to hold the tax document steady such as by a message presented through the computing device display. The count can then be resumed or the count can start over.

In a single or multiple embodiments, if the computing device does not detect shaking or movement that satisfies the first pre-determined criteria, the computing device can notify the user or prompt or instruct the user to shake or move the tax document in view of the video camera. After the first pre-determined criteria has been satisfied with sufficient shaking or other motion, the computing device may notify the user (e.g., by an audible indicator) that the computing device has been prompted to acquire an image of the tax document and to inform the user that the user can stop shaking the tax document. Such audible indicators may be used and inform users when the user's view of the computing device's display screen is obstructed by the tax document being held in view of the video camera, e.g., in the case of a webcam that is integrated into a screen of a monitor of a laptop computer, or when a webcam is attached to a top of a monitor of a desktop computer.

In a single or multiple embodiments, the video is generated by a video camera that is integrated within or in communication with the computing device, such as a webcam. In other embodiments, a separate camera (not integrated) may be in communication with or coupled to a computing device. The video camera may be used for both video and image acquisition, or the video camera may be used to for the video, and a separate imaging component or camera is used to acquire an image of the tax document if so configured.

In a single or multiple embodiments, the computing device is stationary while the tax document is moved. In a single or multiple embodiments, the tax document is stationary while the computing device is moved. In yet other embodiments, the computing device and the tax document are both moved. For example, a user may be holding the tax document in one hand so that the tax document data faces a video camera of a mobile communication device held in the user's other hand, and the tax document and the mobile communication device can be moved back and forth as the motion that prompts the mobile communication device for eventual image acquisition when the shaking is reduced or ceases. Thus, in this embodiment, the first motion and second motion are based at least in part upon relative motion of the computing device and the tax document.

In a single or multiple embodiments, the computing device determines whether an object positioned in view of the video camera is a tax document, e.g., before determining whether the first pre-determined criteria is satisfied. This may involve determining one or more of a color, dimension, field structure, or performing preliminary or partial optical character recognition (e.g., for basic tax form data such as an identifier of the tax document such as "W2"). When the computing device determines that the object is not or does not appear to be a tax document (e.g., by not detecting a certain color, dimension, field structure or certain tax form identifier) the computing device is not prompted to acquire the image regardless of whether the motion would otherwise satisfy the first pre-determined criteria. For example, a user waving a hand across the video camera will not be determined to be a tax document, such that no action is taken regardless of how fast or in which direction the hand is waved. After being activated, if no tax document is detected, the computing device may prompt the user to place a tax document in view of the video camera.

In a single or multiple embodiments, the image that is acquired following satisfaction of the first and second pre-determined criteria is an image that has been processed by being masked or cropped to delete personal or identification data, e.g., for privacy concerns or to improve image processing. In one embodiment the personal or identification data is an image of the user's face. In these embodiments, the computing device may perform facial recognition or receive user input regarding which portion of the image to crop or mask to form a redacted image.

In a single or multiple embodiments, processing the acquired image comprises determining a name or type of the tax document within the image (e.g., by preliminary or partial OCR, or performing a comparison with tax document templates), determining a field structure of the tax document and data within respective fields, mapping respective fields of the tax document within the image to respective fields of an electronic tax return prepared by a tax return preparation application executed by the computing device and importing the determined or recognized data from fields of imaged tax document to respective fields of the electronic tax return, or to respective fields of interview screens generated by the tax preparation application, which then populates respective fields of the electronic tax return. The electronic tax return may be completed by only the user positioning tax documents in the view of the video camera, or with a combination of same and manual input such as by entering data via a touchscreen, keyboard or mouse of the computing device, and the completed electronic tax return can be filed with the tax authority, e.g., by the computing device electronically filing the electronic tax return with a computer of a tax authority or transmitting the electronic tax return to an intermediate, electronic filing server for electronic filing of the completed electronic tax return with the tax authority computer.

In certain embodiments, the electronic return can be prepared and completed by the user holding at least one tax document in view of the video camera without the user manually inputting tax return data by a keyboard or touchscreen of the computing device (otherwise referred to as "touchless" or "video preparation"), whereas other embodiments involve a combination of touchless or video preparation and manual data entry by the user, a combination of touchless or video preparation and importing data from one or more electronic sources such as a prior year electronic tax return or an electronic file of a financial management system, or combination of touchless or video preparation, manual data entry, and importing data from an electronic source.

BRIEF DESCRIPTION OF THE DRAWINGS

The foregoing and other aspects of embodiments are described in further detail with reference to the accompanying drawings, wherein:

FIG. 13 illustrates an example of a tax document image acquired according to embodiments and a user interface generated according to one embodiment for providing options for using the acquired image, retaking the acquired image or redacting part of the image, e.g., for privacy concerns;

DETAILED DESCRIPTION OF ILLUSTRATED EMBODIMENTS

Certain embodiments relate to triggering or prompting a computing device to acquire an image of a tax document utilizing a video camera, e.g., for imaging a tax document and processing the image to import data of the imaged tax document into an electronic tax return. Embodiments thus eliminate or reduce the need for manual tax return data entry, providing for possible motion-based analysis of a video for touchless tax return preparation such that at least a portion of an electronic tax return or an entire electronic tax return can be prepared by the user holding tax documents in front of a video camera rather than manually entering tax return data by typing the data via a touchscreen or keyboard of a computer, tablet or other computing device.

Figure 1:
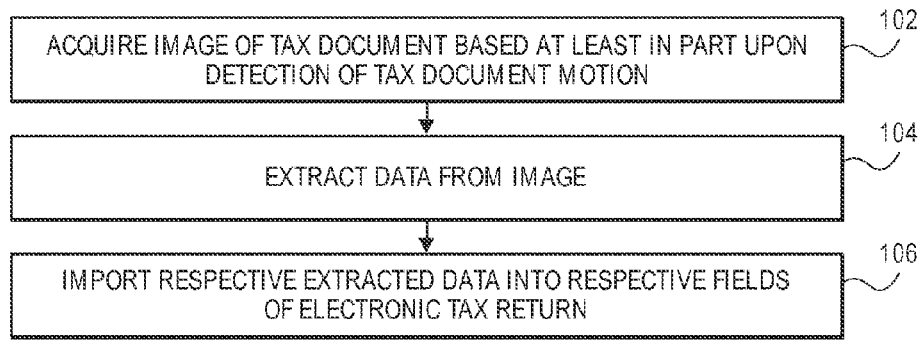
FIG. 1 illustrates one embodiment of a method for motion-based tax document capture and importing data derived from the image into an electronic tax return.

For example, referring to FIG. 1, in a method according to one embodiment, at 102, an image of a tax document is acquired in response to or based at least in part upon detection of tax document motion within a video. At 104, data from the imaged tax document is extracted or determined, and at 106, the determined or extracted data is imported into an electronic tax return.

Figure 2:
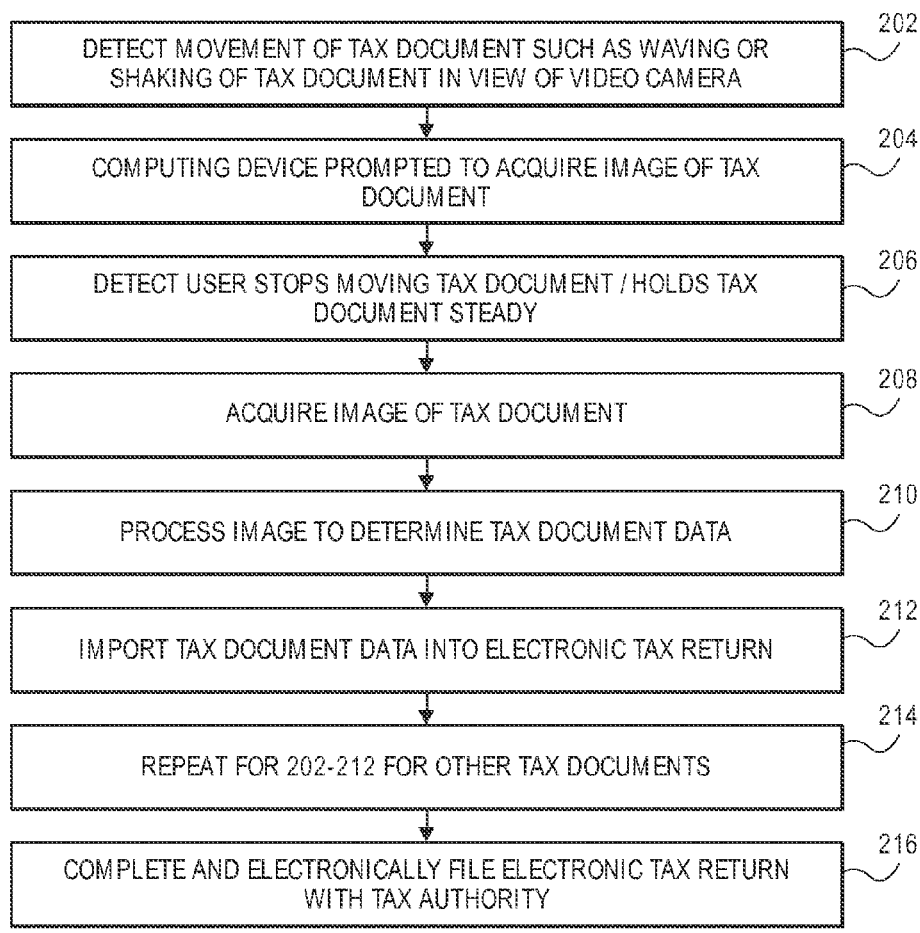
FIG. 2 illustrates one embodiment of a method for motion-based tax document capture based on detection of different motions and importing data of the imaged tax document into an electronic tax return.

As another example, referring to FIG. 2, in a method according to another embodiment, at 202, motion or movement of a tax document by a user and in view of a video camera is detected. This may involve the user waving or shaking the tax document. At 204, the computing device is requested or prompted to acquire an image of the tax document. At 206, the computing device detects when the user stops moving the tax document or holds tax document sufficiently steady or still, and at 208, an image of the tax document is acquired and processed at 210 to determine or extract data of the imaged tax document. At 212, determined or extracted data is imported into an electronic tax return. At 214, steps can be repeated for other tax documents as necessary. At 216, the electronic tax return is completed (by video/motion only, or by a combination of video/motion and manual data entry) and filed with a tax authority.

Figure 3:
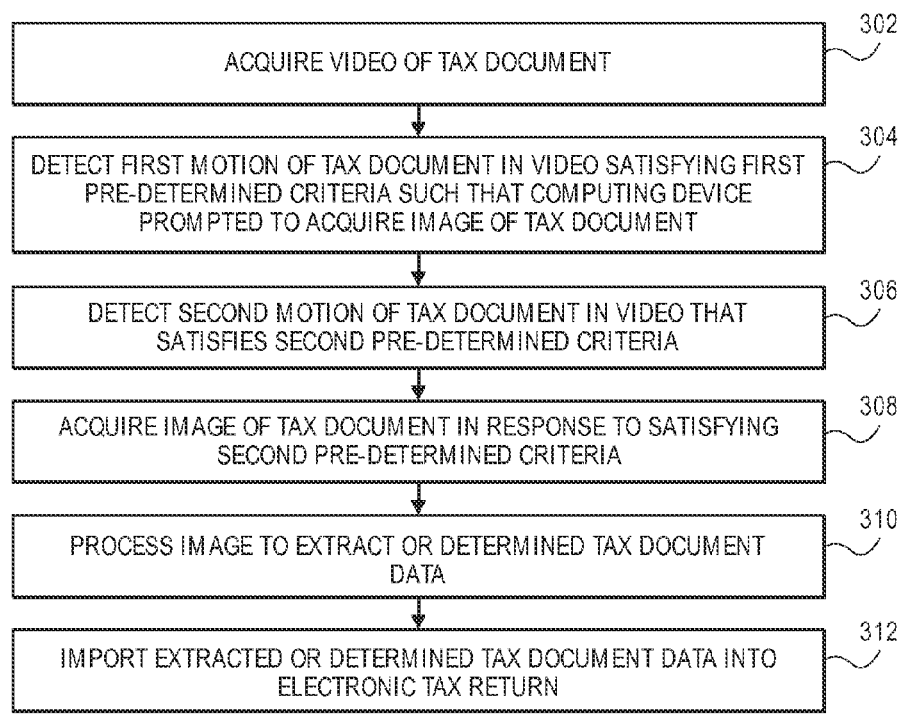
FIG. 3 illustrates one embodiment of a method for motion-based tax document capture based on detection of different motions satisfying respective pre-determined criteria and importing data of the imaged tax document into an electronic tax return.

As yet another example, referring to FIG. 3, in a method according to another embodiment, at 302, a video of a tax document is acquired, at 304, a computing device detects first motion of tax document in the video satisfying first pre-determined criteria such that computing device prompted to acquire image of tax document. At 306, the computing device detects second motion of the tax document in the video satisfying second pre-determined criteria different from the first pre-determined criteria. At 308, the second pre-determined criteria is satisfied, and an image of the tax document is acquired and processed at 310 to determine or extract data of the imaged tax document. At 312, the determined or extracted tax document data is imported into the electronic tax return. FIGS. 4-19 describe embodiments and aspects thereof in further detail.

Figure 4:
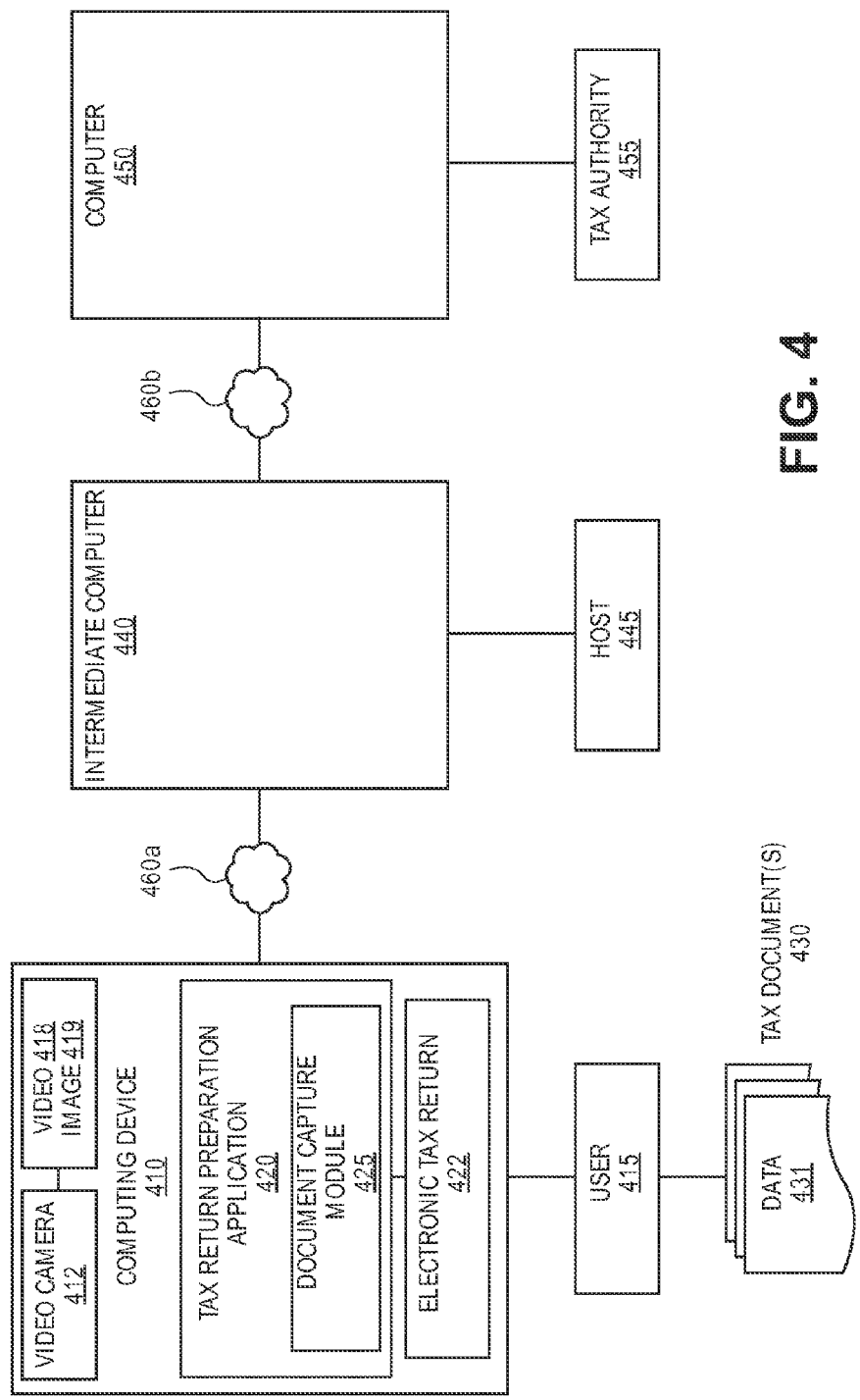
FIG. 4 is a block diagram of a system constructed according to embodiment or involving components for acquiring and processing an image of a tax document according to embodiments.

Referring to FIG. 4, a system constructed according to one embodiment and components thereof that are utilized or involved in video and motion based capture of tax documents comprises or involves a computing device 410 of the user or taxpayer 415 executing a tax return preparation application 420 operable to prepare an electronic tax return 422 based on one or more tax documents 430 containing tax data 431.

The user 415 may be the actual taxpayer or other user such as a tax professional, accountant or attorney preparing the electronic tax return 422 on behalf of the taxpayer. For ease of explanation, reference is made generally to a user 415. The user's computing device 410 may be a desktop, laptop or other computer or computing apparatus such as a tablet computing device, smartphone or mobile communication device executing a program or mobile application for the tax return preparation application 420, or executing a browser to access an on-line version of the tax return preparation application 420. Examples of tax return preparation applications 420 that may incorporate or utilize embodiments include TURBOTAX tax return preparation application and turbotax.com of Intuit Inc. TURBOTAX is a registered trademark of Intuit Inc., Mountain View Calif. Tax return preparation applications 420 such as TURBOTAX tax return preparation application generate a series of interview screens displayed on a screen of the user's computing device 410 and that present questions and fields for the user 415 to type in data, transfer data from a prior year electronic tax return, or import data from an electronic file of a financial management system (FMS) such MINT, QUICKEN and QUICKBOOKS financial managements systems. MINT, QUICKEN and QUICKBOOKS are also registered trademarks of Intuit Inc.

According to embodiments, as generally illustrated in FIG. 4, the tax return preparation application 420 includes a document capture module, engine or element (generally, document capture module 425), which is configured or operable for motion-based tax document image capture utilizing a video 418. For this purpose, the user's computing device 420 includes or is in communication with one or more video cameras 412, one example of which is a webcam. Reference is made generally to a video camera 412, and in more specific examples, to a webcam 412. Computing device 410 in the form of a laptop computer, a tablet computing device or a smartphone may include an integrated video camera 412, whereas a separate webcam 412 may be attached to the top of a monitor of a computing device 410. For ease of explanation, reference is made to the user's computing device 410 and a video camera 412 thereof, which is operable to capture a video 418 and/or acquire an image or take a photograph (generally, image 419).

The resulting video 418 is processed and an image 419 of a tax document 430 is acquired. The image 419 may be a selected frame 418f ("f" indicating "frame") of the video 418, or an image 419 acquired via a separate image capture device or camera (not shown in FIG. 4). The acquired image 419 is processed, e.g., by Optical Character Recognition (OCR) or another computer vision method, in order to determine or extract the data 431 of the imaged tax document 430 and import the data 431 into a corresponding field of the electronic tax return 422. While FIG. 4 illustrates an example implementation in which the document capture module 425 is a component or module of the tax return preparation application 420, embodiments are not so limited.

FIG. 4 also illustrates the user's computer 410 being in communication with an intermediate computer 440 ("intermediate computer") managed by a host 445, such as Intuit Inc. or another provider of the tax preparation application 420. The intermediate computer 440 may manage or host an on-line version of the tax preparation application 420 and/or serve as an electronic filing server. The intermediate computer 440 may be in communication with a computer 450 of a tax authority 455 for purposes of electronically filing tax returns 422.

The tax authority 455 with which tax returns 422 are filed may be a federal tax authority such as the Internal Revenue Service (IRS), a state tax authority such as the State Franchise Board of California or other federal, state or local tax collecting entity to which taxes are paid. Examples of tax documents 420 for a tax authority 455 such as the Internal Revenue Service (IRS) include: W-2, 1099-A, 1099-B, 1099-C, 1099-DIV, 1099-G, 1099-H, 1099-INT, 1099-OID, 1099-LTC, 1099-PATR, 1099-Q, and 1098. It should be understood that this listing of tax documents 430 is provided as illustrative examples, and is not exhaustive, and that different tax collecting entities utilize different tax documents. For ease of explanation, reference is made generally to a tax authority 455 and a tax document 430, but it will be understood that tax authority 455 refers to various tax collecting entities, including local, state and federal tax collecting entities, and that the user 415 may receive various tax documents 430 from such entities for use in preparing and filing an electronic tax return 422 with various tax authorities 455.

Computing devices or computers 410, 440 and 450 are in communication with each other through respective networks 460a-b (generally, network 460). The user's computing device 410 may be in communication with the intermediate computer 440 through a network 460a, and the intermediate computer 440 may be in communication with the tax authority computer 450 through a network 460b. Although not illustrated in FIG. 4, a computer of the host 445 other than the intermediate computer 440 may host an online version of the tax preparation application 420, which is accessed by the user's computing device 410 through a network 460. Each of the networks 460 and other networks discussed herein may be different, or two or more networks 460 may be the same depending on the system configuration and communication protocols employed. One or more or all of the networks 460 may be, for example, a cellular network, a wireless network, a Local Area Network (LAN) and/or a Wide Area Network (WAN) or a combination of two or more networks. Reference to a network 460 generally is not intended to refer to a specific network or communications protocol, and it should be understood that embodiments can be implemented using various networks and combinations thereof.

Figure 5:
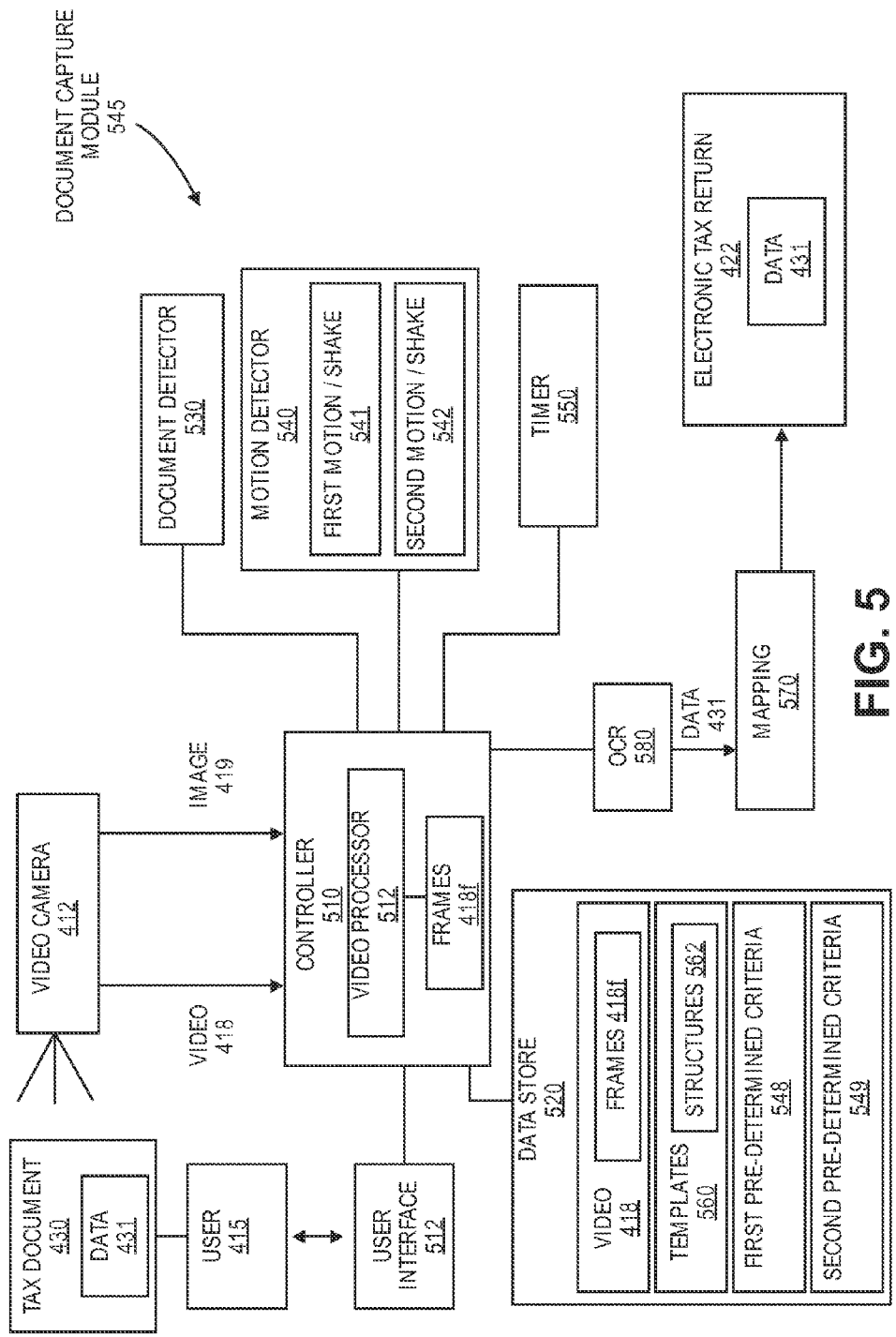
FIG. 5 is a block diagram of a system constructed according to embodiment and that further illustrates a motion-based capture module configured according to one embodiment.

Referring to FIG. 5, the document capture module 425 configured according to embodiments is illustrated in further detail and FIG. 5 also shows how the document capture module 425 is in communication with other components for implementing embodiments. In the illustrated embodiment, the document capture module 425 includes a controller 510, which may be a component of a controller or tax engine of the tax preparation application 420 that generates the interview screens and the electronic tax return 422, such that the user interface (UI) 512 with the interview screens is presented to the user 415, or the controller 510 may be separate from the tax engine or controller of the tax preparation application 420. The video camera 412 such as a webcam that is a component of or in communication with the user's computing device 410 is used to acquire a video 418 of a tax document 430 held by the user 415 in view of the video camera 412. The resulting video 418 may be temporarily or permanently stored in memory or a data store 520 (generally, data store 520) as needed. The controller 510 includes or executes a video processor 512 is operable to segment the video 418 into frames 418f or groups of frames 418f. While the video processor 512 is shown as being a component of the controller 510, embodiments are not so limited. As described in further detail below, in one embodiment, frames 418f are provided to a document detection module or document detector 530, which is operable to determine whether an object held by the user 415 in view of the video camera 412 is a tax document 430, and a motion detection module or motion detector 540, which is operable to detect tax document motion 541 or when a tax document 430 is moved (e.g., shaken or waved), e.g., by the user 415, in view of the video camera 412 indicating a request by the user 415 to take an image 419 of the tax document 430, and to determine when the tax document 430 is held steady 542 to allow for acquisition of the image 419. The illustrated embodiment also includes a timer 550, which may be used for displaying a count of how long the tax document 430 should be held steady 542 so that the tax document 430 can be viewed and focused for acquiring the image 419.

FIG. 5 further illustrates the data store 520 including templates 560 of tax documents 430, which may show a basic structure 562 such as number of fields, configuration or arrangement of fields, document and/or field dimensions, or other key identifiers of a tax document 430, for use by a mapping element 570 to identify fields of an electronic tax return 422 or interview screen of the tax return preparation application 420 should be populated with data determined from recognition processing 580. Thus, having the recognized tax document data 431, and identifies of the fields of interview screens or the electronic tax return 422, the recognized data 431 can be imported into the fields identifying by mapping 570 to prepare and/or complete the electronic tax return 422.

While FIG. 5 illustrates a system configuration in which the controller 510 is a central processing that manages or coordinates other components or modules, it will be understood that certain components or modules may be in communication with other components or modules, such that FIG. 5 is provided as one example of how embodiments may be implemented, and for ease of explanation and illustration. Further, it will be understood that process steps executed by or involving the controller 510 may be performed sequentially or in parallel. Moreover, it will be understood that while certain modules or elements are described as being separate from the controller 510, it will be understood that these modules or elements may also be integrated within or components of the controller 510. Thus, when steps are described as being performed by a particular module or element, they may also be considered to be performed by the controller 510, and vice versa. Having described system components and how they may function and communicate with other components, further aspects of how embodiments may be implemented with the system components shown in FIG. 5 are described in further detail with reference to FIGS. 6-19.

Figure 6:
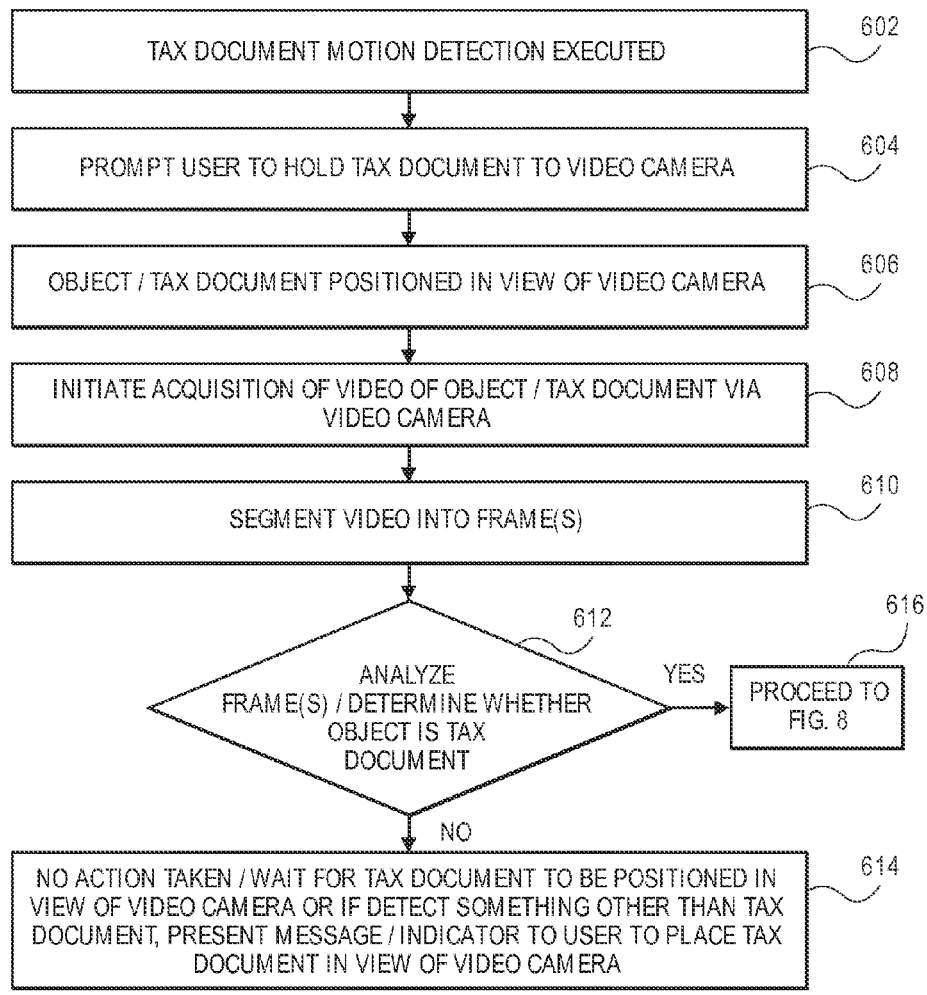
FIG. 6 illustrates one embodiment of a method for detecting whether an object within view of a video camera is a tax document.
Figure 7:
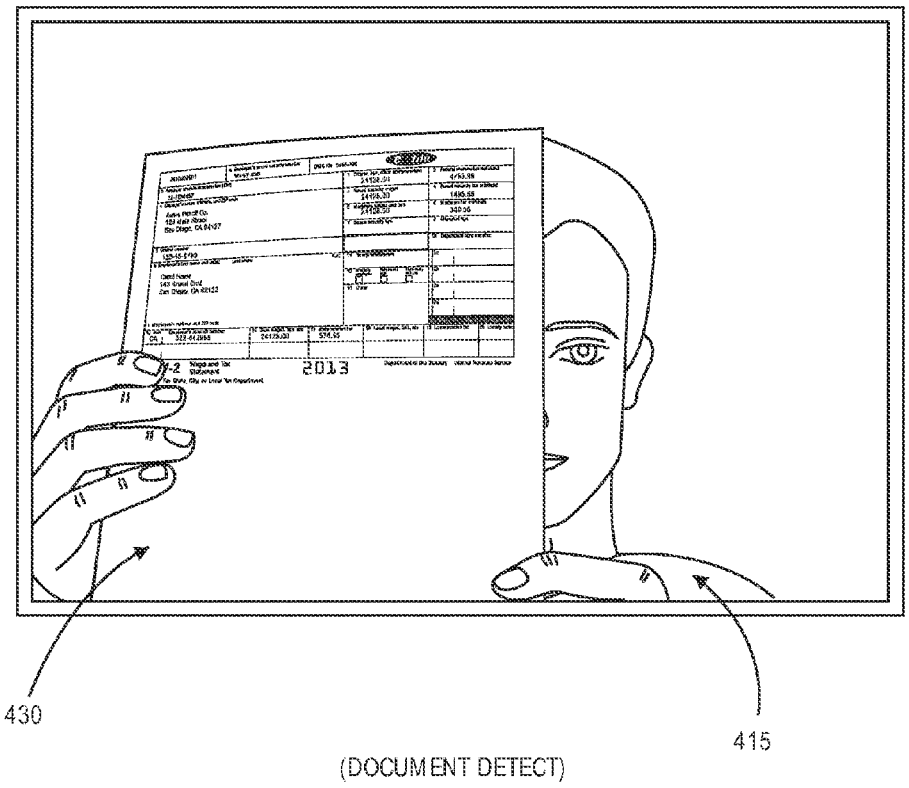
FIG. 7 illustrates how a user can hold an object in view of a video camera for purposes of determining whether the object is a tax document according tone embodiment.

With continuing reference to FIG. 5 and with further reference to FIGS. 6-7, in a method according to one embodiment, at 602, the document capture module 425 is initiated or executed, e.g., by the user 415 navigating a menu of the tax preparation application 420 and selecting a menu option such as "video import" to launch the document capture module 425. At 604, the controller 510 prompts the user 415 to hold up a tax document 430 in view of the video camera 412, and at 606, as shown in FIG. 7, the user 415 holds an object, or a tax document 430 that has not yet been verified by the document capture module 425 as being or likely being a tax document 430, in view of the video camera 412. In the embodiment illustrated in FIG. 7, the object held by the user 415 is a tax document 430.

In embodiments involving a computing device 410 of laptop computer and a webcam 412 integrated into thereto, e.g., within a display screen of the laptop computer, or involving a webcam 412 attached to a frame of a monitor of a desktop computer, the user holding the object or tax document 430 may involve the user 415 holding the object or tax document 430 in front of the webcam 412 while obstructing or blocking at least a portion of the computing device display. In embodiments involving a computing device 410 of a tablet computing device including an integrated video camera 512 such as the IPAD tablet device of Apple, Inc., this may involve placing the object or tax document 430 facing up on a table or desk, and holding the tablet computing device 410 over the object or tax document 430, which may result in the user 415 not being able to view the screen of the tablet computing device 410. IPAD is a registered trademark of Apple Inc., Cupertino, Calif. Embodiments involving a computing device 410 in the form of tablet computing device or a smartphone including an integrated video camera 412 may involve the user 415 holding the object or tax document 430 in one hand and the tablet computing device or smartphone in the other in front of the user 415, with the object or tax document 430 facing the video camera 412. Depending on how the user's two hands are positioned, this may result in at least a portion of the display screen of the tablet computing device or smartphone being obstructed. Accordingly, it will be understood that embodiments may involve various types of computing devices 410, which may be stationary, movable or handheld or not configured for being handheld and instead being suitable for placement on a desk or table.

Continuing with reference to FIG. 6, at 608, the controller 510 initiates acquisition of a video 418 of the object or tax document 430, and at 610, stores the video 418 to the data store 420 as needed and executes a video processor 512 to segment the video 418 into individual frames 418f or groups of frames 418f. In the illustrated embodiment, in which the system includes a document detector 530, at 612, the controller 510 provides one or more frames 418f to the document detector 530, which determines whether the object placed in view of the video camera 412 is, or appears or is likely to be, a tax document 430. For this purpose, the document detector 530 may analyze various attributes of the object appearing within a frame 418f such as one or more physical or optical attributes of the object that can be determined from the frame 418f such as the object's color, shape, presence of features such as lines or boxes, sizes or dimensions of the document and/or features, whether the object includes any alpha-numeric data, and other document identifiers. The document detector 530 may consider one or multiple attributes or factors for this purpose, and certain attributes or factors may be weighted more heavily than others or prioritized or serve as conditional requirements in order for the document detector 530 to determine that an object is or is likely to be a tax document. According to one embodiment, the document detector 530 utilizes a Hough transform algorithm to detect a tax document 530 based on detection of regular shapes or objects having straight lines, e.g., utilizing one or more thresholding parameters of an image or frame 418f such as a number of rectangular shapes within a pre-defined area and intensity of detected lines and edges. Pseudocode for one example of how a Hough transform may be utilized for detecting a tax document is provided below:

Apply adaptive threshold to image coming in
Apply image dilation operation to reduce number of contours to consider
lines=Apply Hough to image
for line in lines
    filtered squares=lines that form square
result squares=Apply Union Merge on (filtered squares)
check that there is only one merged rectangle and its aspect ratio is acceptable for tax document
check that merged square covers at least 30% of frame
if pass check for 5 consecutive video frames, then determine tax document in frame Thus, for example, if the object is circular in shape, the document detector 530 may determine that the object probably is not a tax document 430 since tax documents 430 are typically flat and rectangular in shape. As another example, if the object is blue, the document detector 430 may determine that the object probably is not a tax document 430 since tax documents 430 are often white. While the above examples involve a single attribute, it will be understood that combinations of attributes may be utilized, and that the attributes or combinations thereof utilized may depend in part upon the particular tax document.

Step 612 may also involve determining whether there is a field structure or boxes within the object, if the object is a document. When the document detector detects that the object includes a number of boxes, it may determine that the object is likely a tax document 430 since a tax document 430, such as Form W-2, typically has boxes or fields containing data. The document detector 430 may determine a shape or field structure within the tax document 430 and perform a comparison with tax document templates 560 in the data store 520 to determine whether the structure of the tax document 430 matches a field structure 562 or other structural attribute of a template 560, thus determining that the object is likely a tax document 430. Step 612 may also involve the document detector 530 performing preliminary or partial OCR to identify pre-determined tax document identifiers such as a document name (e.g., W-2 or 1099) or general tax document field data or identifiers such as "employer" or "city" or "social security number" which indicate that the object is more likely to be a tax document 430. It will be understood that the document detector 530 may utilize various numbers and types of criteria, and that the criteria mentioned above are described as illustrative examples of how embodiments may be implemented.

Continuing with reference to FIG. 6, at 614, when the document detector 530 cannot verify or confirm, or verify or confirm with an acceptable probability, that the object that was held by the user 415 in view of the video camera 412 is a tax document 430, then the document detector 530 takes no further action and awaits for a tax document 430 to be detected. The document detector 530 may prompt the user 415 again to place a tax document 420 in view of the video camera 412 after a pre-determined amount of time passed since the document capture module 425 was launched in response to the user 415 selecting the "video import" menu option. At 616, when the document detector 530 can verify or confirm, or verify or confirm with an acceptable probability given the attributes considered, that the object that was held by the user 415 in view of the video camera 412 is a tax document 430 (as shown in FIG. 7), then the document detector 530 informs the controller 510 of the result, and the method proceeds to FIG. 8. While certain embodiments may involve preliminary object detection as described above with reference to FIGS. 6-7, object detection is optional and other embodiments may proceed directly to FIG. 8 after the user's launching of the detection module 425 or selection of a "video import" menu option of the tax preparation application 420.

Figure 8:
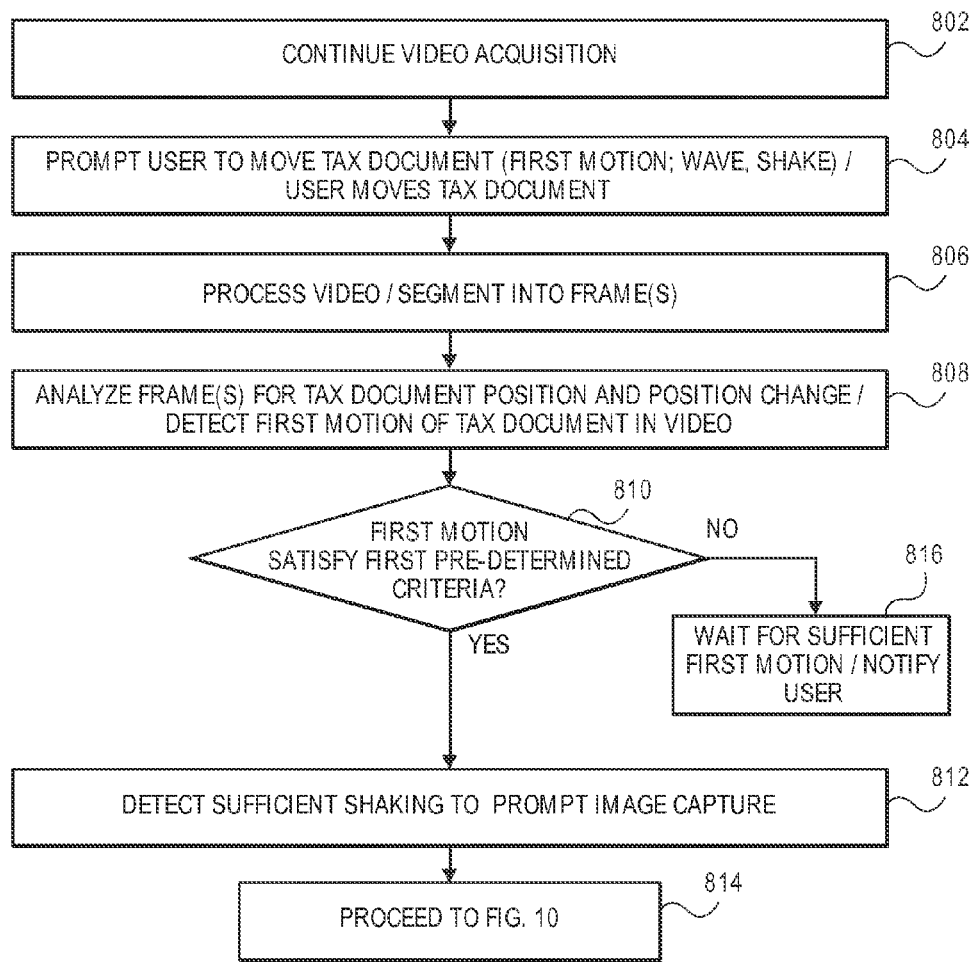
FIG. 8 illustrates a method according to one embodiment for motion-based image acquisition prompting according to one embodiment.

Referring to FIG. 8, at 802, the controller 510 continues or resumes acquiring video 418 (if video 418 was temporarily suspended pending the result generated by the document detector 530), and processing the video 418 and storing video 418 and/or frames 418f to the data store 520 as necessary.

Figure 9:
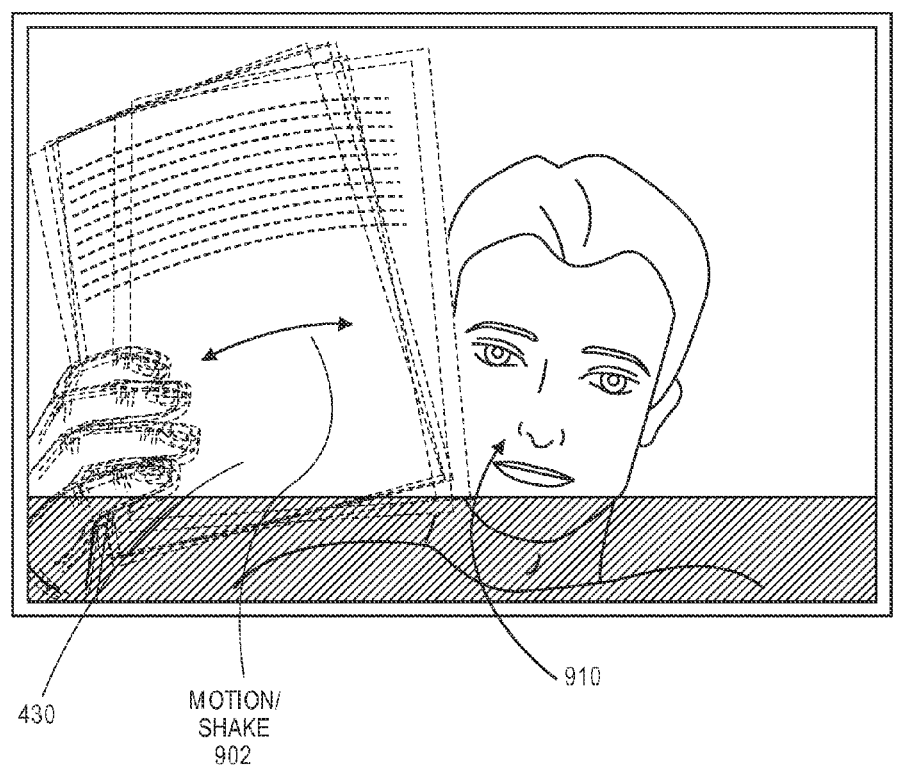
FIG. 9 illustrates how a user can move or shake a tax document in view of a video camera in order to initiate acquisition of an image of the tax document according to one embodiment.

At 804, and with further reference to FIG. 9, the controller 510 prompts the user 415 to move the tax document 430, which may involve prompting or notifying the user 415 to move, shake or wave 902 the tax document 430 in view of the video camera 412. In response, the user 415 moves 902 the tax document 430.

The form of the prompt or notification presented to the user 415 may vary depending on the type of computing device 410 utilized in order to accommodate to the configuration of the computing device 410 and arrangement of the tax document position and display screen of the computing device 410. For example, in embodiments in which the tax document 430 is positioned to partially or completely obstruct the display screen of the computing device 410, it may be difficult for the user 415 to view a message displayed on a screen of the computing device 410 since the tax document 430 is being held between the user 415 and the display screen. In these situations, the controller 510 can generate an audible prompt or message or an audible prompt or message (e.g., "shake your tax document to start") together with a type of displayed message or indicator such as the audible message being played together with the display screen being turned green to indicate that the user 415 should proceed with shaking the tax document 430. In other embodiments in which the display screen of the computing device 410 is visible, the controller 510 may also generate a message that is displayed to the user 415 through the UI 512, and such a displayed message may also be displayed together with one or more of the audible message and color indicator.

In the embodiment illustrated in FIG. 9, the user's face 910 and the tax document 430 are both in view of the video camera 412, but in other embodiments, the user 415 may be moving 902 the tax document 430 while covering or blocking the user's face 910 from being viewed.

Referring again to FIG. 8, at 806, the controller 510 processes or segments the video 418 including the moving 902 tax document into frames 418f or groups of frames 418f, and at 808, analyzes frame(s) 418f to detect, a changing position of the tax document 430 within video frames 418f or to detect a first motion 902 of the tax document 430 in the video 418. At 810, the controller 510, e.g., by use of the motion detector 540, determines whether the first motion 902 satisfies first pre-determined criteria 548, which may be specified or stored in the data store 420 or other component such as the controller 510 or motion detector 540 as appropriate. The motion detector 540 analyzes the movement or motion 902 of the tax document 530 within video frames 418f to determine whether the detected position change or motion of the tax document 430 within the video 418 is greater than a pre-determined minimum change or motion, or value thereof, and thus indicative of the user's gesture in the form of requesting or prompting the document capture module 425 to eventually acquire an image 419 of the tax document 430. The motion detector 540 may consider one or more factors including a change of tax document 430 position, velocity or acceleration of tax document motion and movement direction. Factors that are utilized for this purpose can be weighted to emphasize one over the other.

For this purpose, according to one embodiment, the motion detector 540 utilizes motion field computation or analyzes optical flows of the first motion, e.g., as determined by an optical flow estimator 545 such as a Lucas-Kanade optical flow estimator algorithm. Determining whether the motion 902 satisfies the first pre-determined criteria 548 may involve comparing data of at least one attribute of an optical flow or result generated by the optical estimator 545 and a first pre-determined value to determine whether the first pre-determined criteria 548 is satisfied, thus indicating the user's intent or request to acquire an image 419 of the tax document 430. Pseudocode for one example of how a Lucas-Kanade optical flow estimator algorithm can be utilized for detecting motion or user gesture requesting image acquisition is provided below:

```
flow vectors=Compute optical flow vectors using Lucas Kanade on 50 image frames resample flow vector (see code below)
for (var i=1; i<path_pts.length; i++)
{
var d=Distance(path_pts[i-1], path_pts[i]);
if ((D+d)>=I)
{
var qx=path_pts[i-1].X+((I-D)/d)*(path_pts[i].X-path_pts[i-1].X);
var qy=path_pts[i-1].Y+((I-D)/d)*(path_pts[i].Y-
path_pts.splice(i, 0, q);
D=0.0;
}
else D+=d;
}
if (newpath_pts.length==n-1)
newpath_pts[newpath_pts.length]=new    Point(path_pts[path_pts.length-1].X,
path_pts[path_pts.length-1].Y);
``` return newpath_pts;
find path distance between ideal shake gesture (sine function) and resampled path_pts,
if their distance is low enough, determine shake has been detected Referring again to FIG. 8, at 812, when the first pre-determined criteria 548 is satisfied, e.g., by sufficient shaking or waving motion 902 of the tax document 430 by the user 415, then at 814, the method proceeds to FIG. 10, else at 816, the controller 510 continues to analyze video 418 to detect sufficient motion 541 of the tax document 430 within the video 418 that satisfies the pre-determined criteria 548, and may, after a certain time, notify the user 415 to increase the motion of the tax document 415 or terminate the process.

Figure 10:
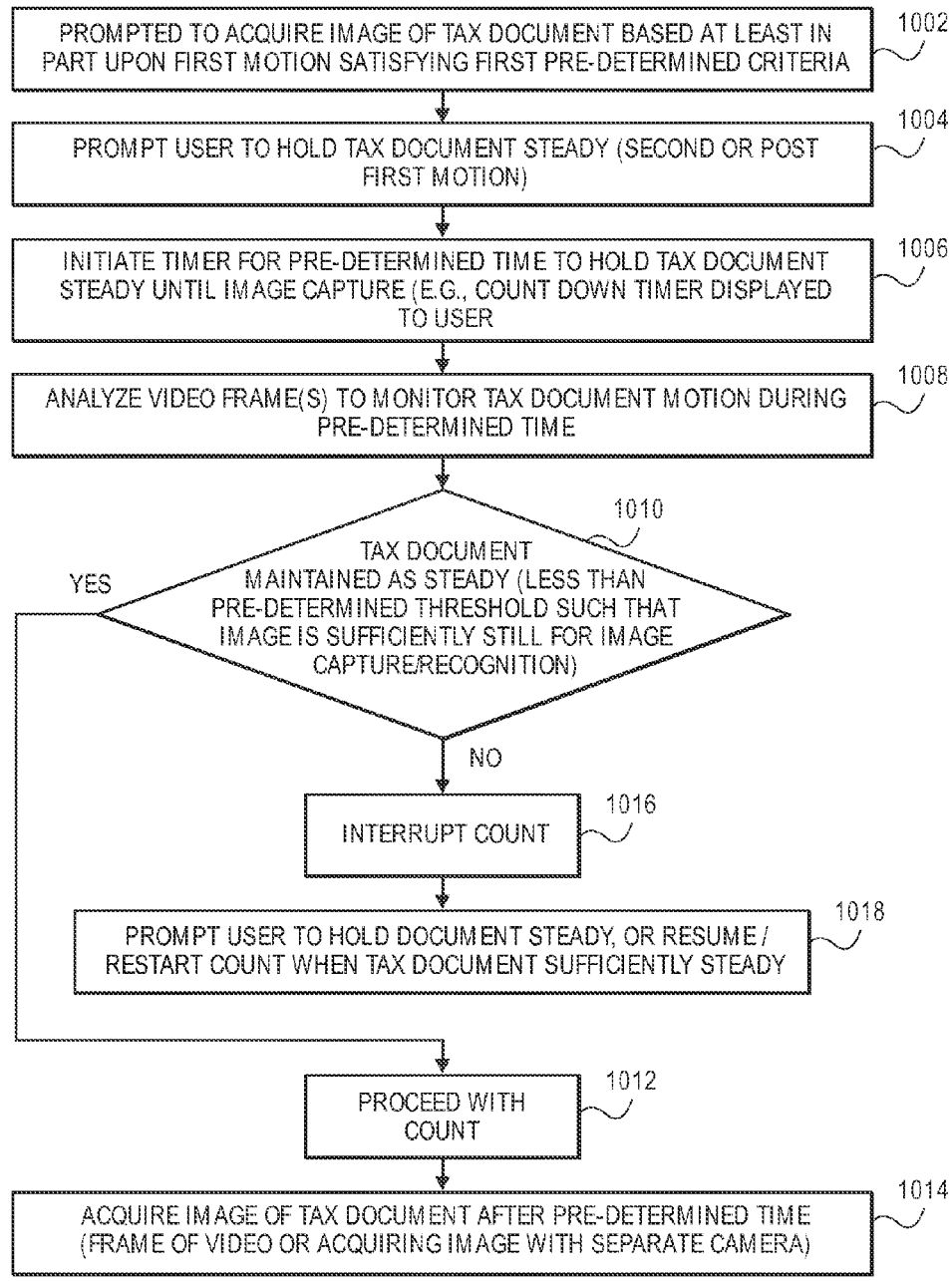
FIG. 10 illustrates a method according to one embodiment for determining whether and when an image of a tax document should be acquired following detection of movement or shaking of the tax document by the user.

Referring to FIG. 10, as a result of the user 415 moving 902 the tax document 430 and such movement satisfying the first pre-determined criteria 548, at 1002, the document capture module 425 is promoted or requested by the user 415 to acquire an image of the tax document, at 1004, in response to being prompted by the user 415, the controller 510 responds with prompting the user 415 to hold the tax document 430 still or steady (second motion 542, or post first motion).

Figure 11A:
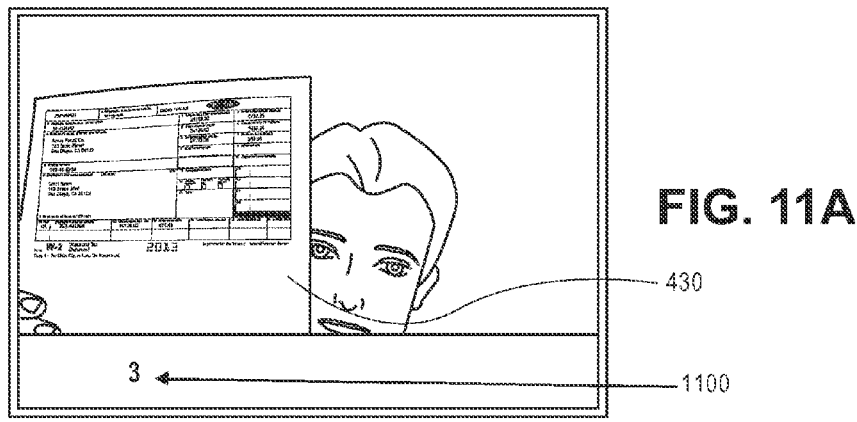
FIGS. 11A-C illustrate how a timer count can be presented to a user according to one embodiment in order to inform the user how long the document should be held steady and when the image will be acquired according to one embodiment.
Figure 11B:
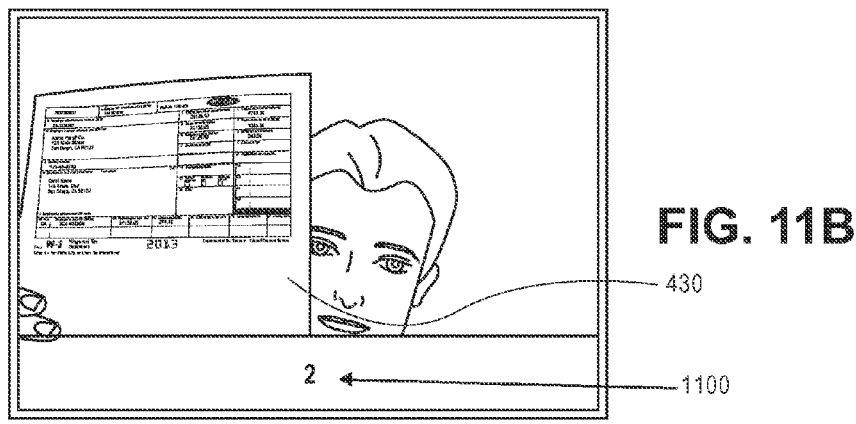
Figure 11C:
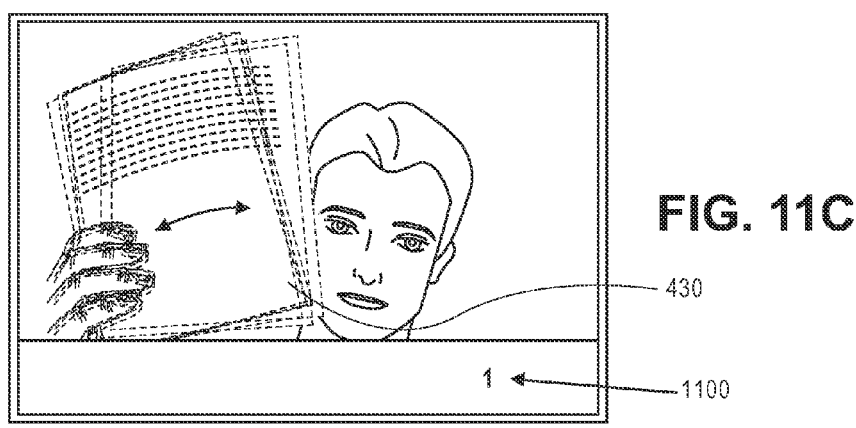

For this purpose, and with further reference to FIGS. 11A-C, at 1006, the controller 510 may execute the timer 550 to count a pre-determined time that the user 415 should hold the tax document 430 steady until an image 419 of the tax document 430 is acquired. In the embodiment illustrated in FIGS. 11A-C, the timer 550 is a countdown timer such that the pre-determined count 1100 of 3, 2, 1 is displayed to the user 415 (as shown in FIGS. 11A-C) to advise the user 415 of how long the tax document 430 should be held steady and when the image 419 will be acquired.

During the countdown 1100, at 1008, the motion detector 530 continues to analyze the second motion 542 or the degree of stillness or steadiness of the tax document 430. For example, the motion detector 530 may employ the same optical flow estimator 545, such as Kanade-Lucas flow estimator discussed above, but in a different way such that rather than monitoring whether tax document motion 541 is greater than a first pre-determined amount 548 in order to initiate image capture, the optical flow estimator 545 is used to monitor whether the motion 542 is less than a second pre-determined amount 549 such that the tax document 430 is sufficiently steady to allow for an image to be captured and for the data within the captured image to be recognized. In other words, in one embodiment, the same optical flow estimator 545 can be used to monitor the second motion 542, or motion while the user 415 is holding the tax document 430 steady, to ensure that the resulting image 419 will not be blurry due to excessive motion of the tax document 430 when the tax document 430 should be sufficiently steady for image acquisition. Thus, while the user 415 may hold the tax document 430 very still or steady, there is some motion, albeit a small amount of motion detectable by the video camera 412, and since the user 415 cannot or most likely will not hold the tax document 430 perfectly still, hence reference to "second motion" 542.

Figure 12A:
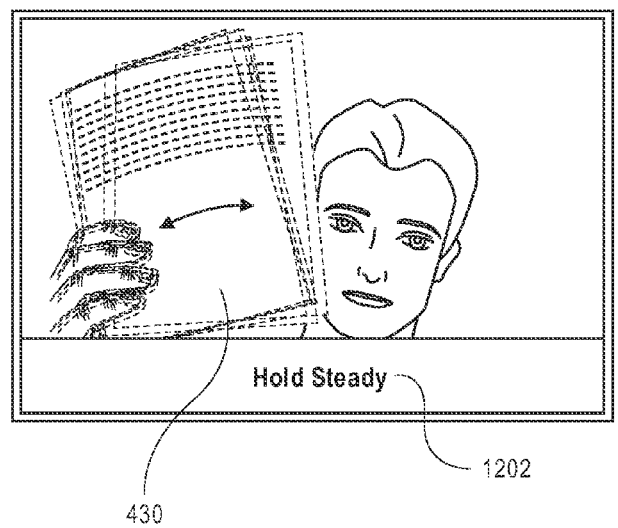
FIGS. 12A-B illustrate how the user can be prompted to hold the tax document steady in order for image acquisition to proceed according to one embodiment.
Figure 12B:
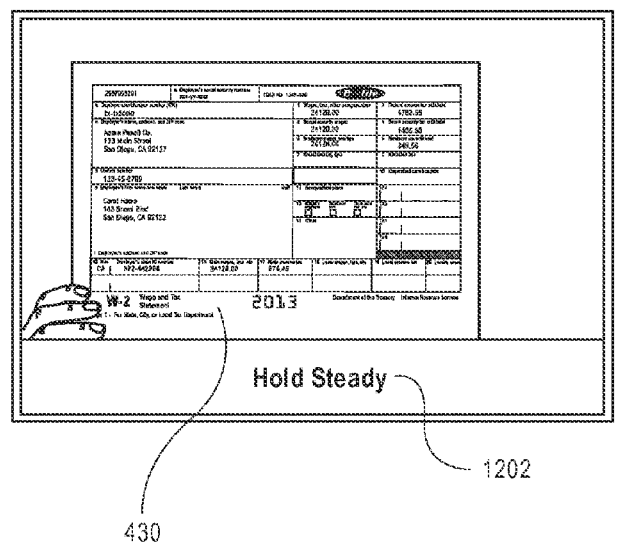

With continuing reference to FIGS. 11A-C, and with further reference to FIGS. 12A=B, during the time the countdown time in preparation for acquiring an image 419, the user 415 may move the tax document 430 (as shown in FIG. 11C, in which the user 415 is no longer maintaining the tax document 430 steady as shown in FIGS. 11A-B during the count 1100). Thus, the motion detector 540 determines that the detected second motion 542 no longer satisfies the second pre-determined criteria 549. As a result, if an image 419 were taken, the resulting image 419 may be too unsteady resulting in a lower quality image such that data recognition 580 would not function properly. In response, as shown in FIGS. 12A-B, the controller 510 can present a message or other indicator 1202 to the user 415 advising the user 415 to hold the tax document 430 steady. In this regard, the controller 510 can display a message 1202 such as "Hold steady" on the screen, a message in the form of screen color, e.g., by changing the screen color to "red," or from "green" (as discussed above) to red" to indicate "stop" shaking and to hold the document 430 steady, present an audible indicator informing the user 415 to hold the tax document 430 steady, or a combination of the above.

Referring again to FIG. 10, when the tax document 430 is held steady for the pre-determined time such that the timer 550 count is completed at 1012, then at 1014, an image 419 of the tax document 430 is acquired. If, at 1016, the count is interrupted as a result of the second pre-determined criteria 439 not being satisfied during the per-determined count time of the timer 550 such that the tax document 430 was not held sufficiently steady for the required time, then at 1016, the timer 550 can be interrupted or reset, the "hold steady" message 1202 can be presented to the user 415, and the motion detector 540 can monitor subsequent video frames 418f for when the tax document 430 is held sufficiently steady 542, to restart the timer 550 and eventually acquire an image 419 of the tax document 430 (steps 1012-1014).

According to one embodiment, the same video camera 412 that acquires the video 418 can be used to acquire the image 419. For this purpose, the image 419 may be a single video frame 418f that is selected at the expiration of the timer's 550 count. The video camera 412 may also be configured for dual functionality such that an image 419 is acquired independently of the video 418. In other embodiments, a separate image capture device or camera (not illustrated in FIGS. 4-5) other than the video camera 412 may be used and triggered by the controller 510 to acquire an image 419 of the tax document 430 after expiration of the timer's 550 count. Accordingly, while certain embodiments are described with reference to the same video camera 412, such as a webcam, being used to acquire the video 418 and eventual image 419, embodiments are not so limited.

Figure 13:
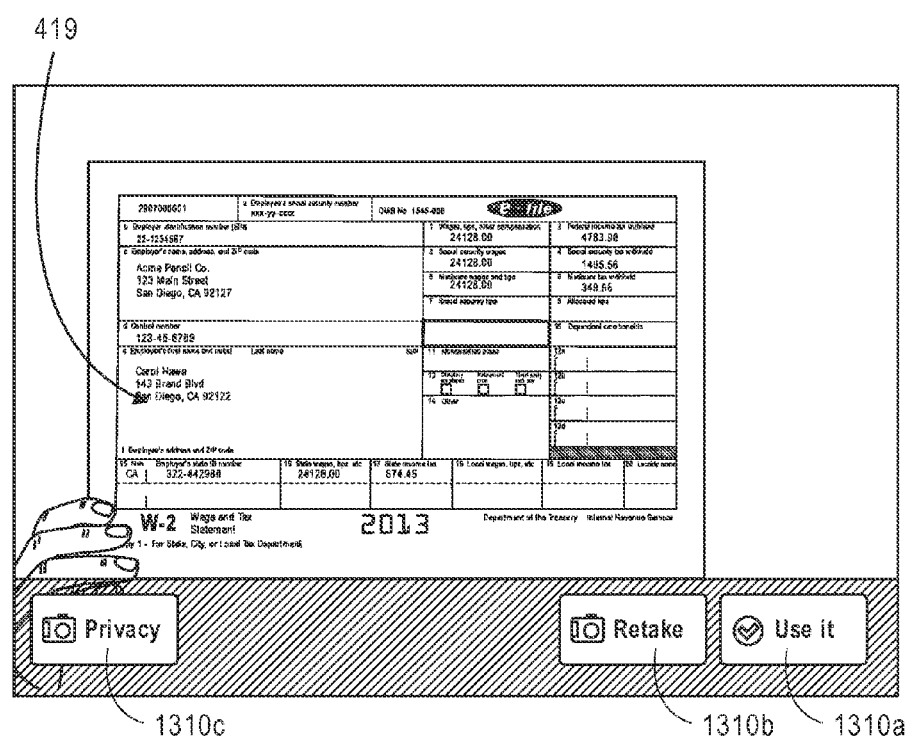
Figure 14:
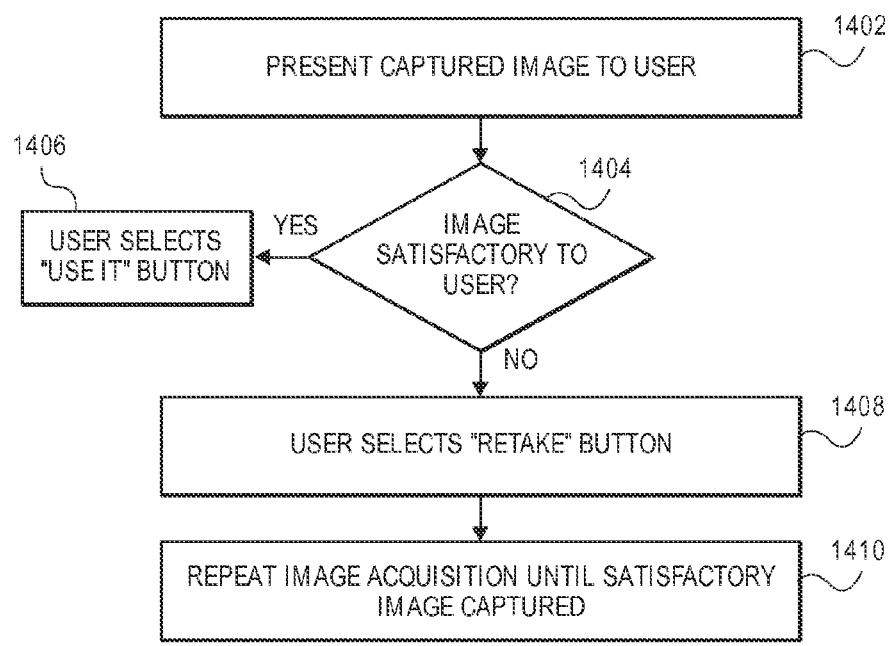
FIG. 14 illustrates a method involving a user interface with interface elements that allow a user to select whether to use an acquired image or retake the image according to one embodiment.
Figure 15:
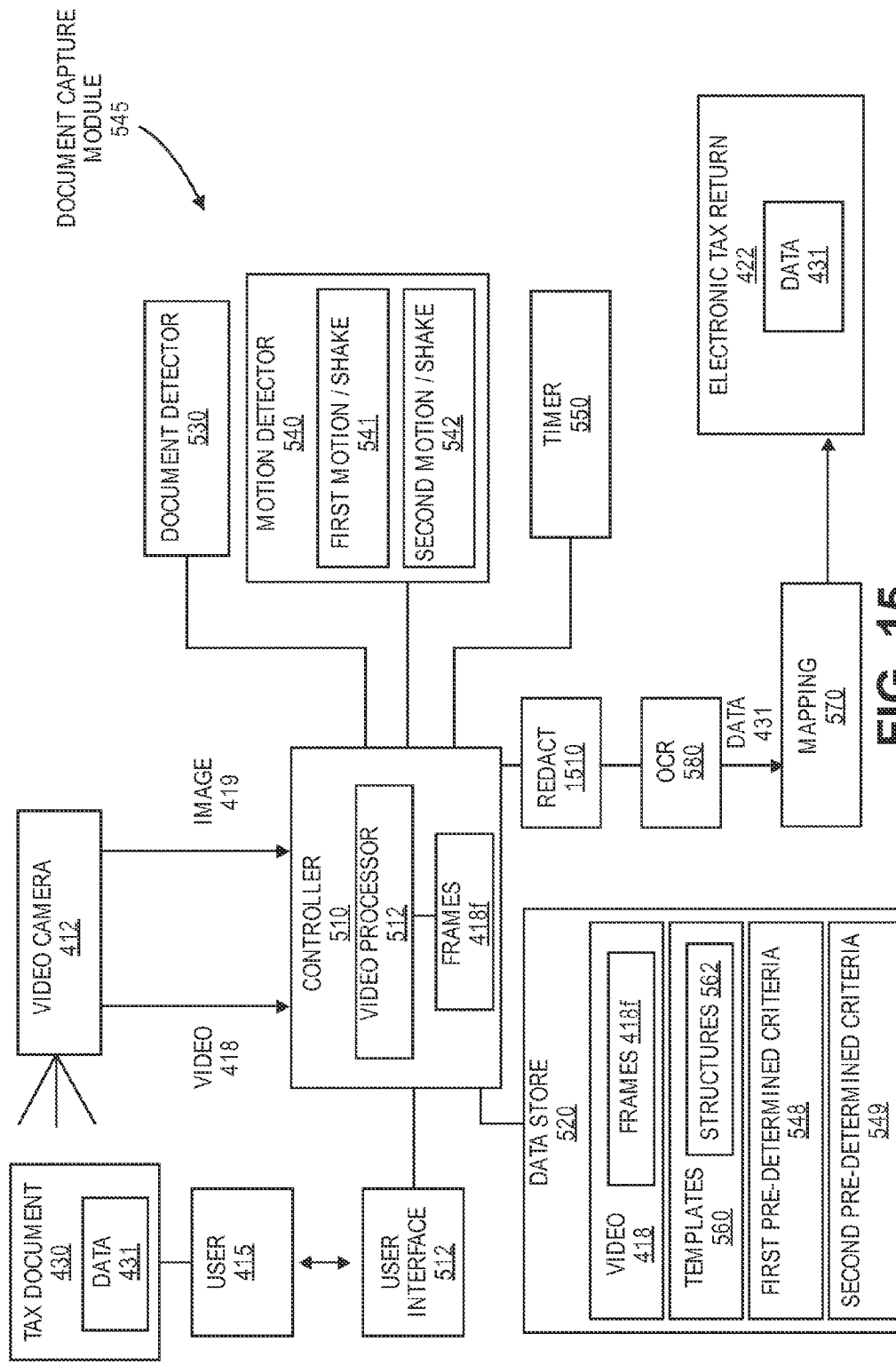
FIG. 15 is a block diagram illustrating a system constructed according to embodiment and that further illustrates a motion-based capture module configured according to one embodiment that includes a redaction module.

Referring to FIGS. 13-15, having acquired the image 419 following satisfying the first and second pre-determined criteria 548, 549, the image 419 is displayed to the user 415 and buttons 1310a-c for options regarding how to proceed are displayed to the user 415. In the illustrated embodiment, the screen presents the image 419 together with buttons 1310a-c for "Use It," "Retake" and "Privacy" 1310c.

Referring to FIG. 14, at 1402, the image 419 is presented to the user 415, and the user 415 can indicate, at 1404, whether the image 419 is acceptable to the user 415. For example, the image 419 may not be acceptable when a portion of the tax document 430 was not captured, or the image 419 is not as clear as the user 415 prefers.

At 1406, if the image 419 is acceptable, the user 415 selects the "Use it" button 1310a. The controller 510 receives this input, and in response, proceeds to process the image 419 at 1412. Otherwise, then at 1404, the user 415 can select the "Retake" button 1310b. In response to receiving the user's "retake" request, at 1406, the controller 510 can repeat steps described above until a satisfactory image 419 is acquired, and at 1408, the controller 510 proceeds to process the image 419 at 1412.

Referring to FIG. 15, in a system constructed according to one embodiment, at least a portion of the acquired image 419 is redacted or masked in order to cover or eliminate personal or private information in the acquired image 419. For this purpose, as shown in FIG. 15, the document capture module 425 described above may include a redaction module 1510 ("Redact" in FIG. 15) that is utilized before the acquired image 419 is processed using OCR or another computer vision method. Thus, as shown in FIG. 15, the acquired image 419 is provided to the redaction module 1510, the output of which is provided to the image processor 580. Other components shown in FIG. 15 are described above and not repeated.

Figure 16:
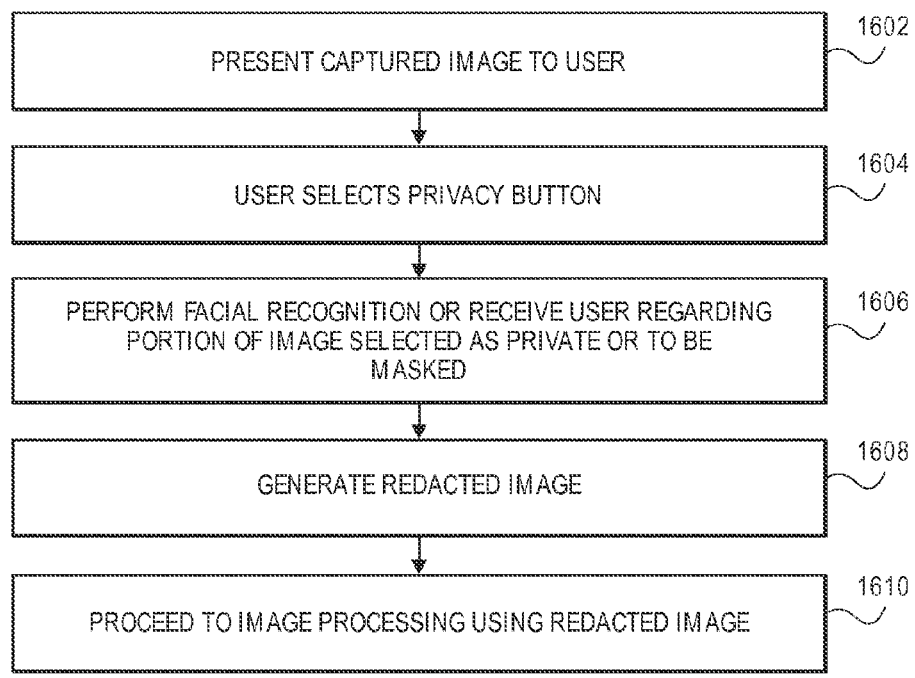
FIG. 16 illustrates a method involving a user interface with interface elements that allow a user to select to redact a portion of an acquired image before image processing according to one embodiment.
Figure 17A:
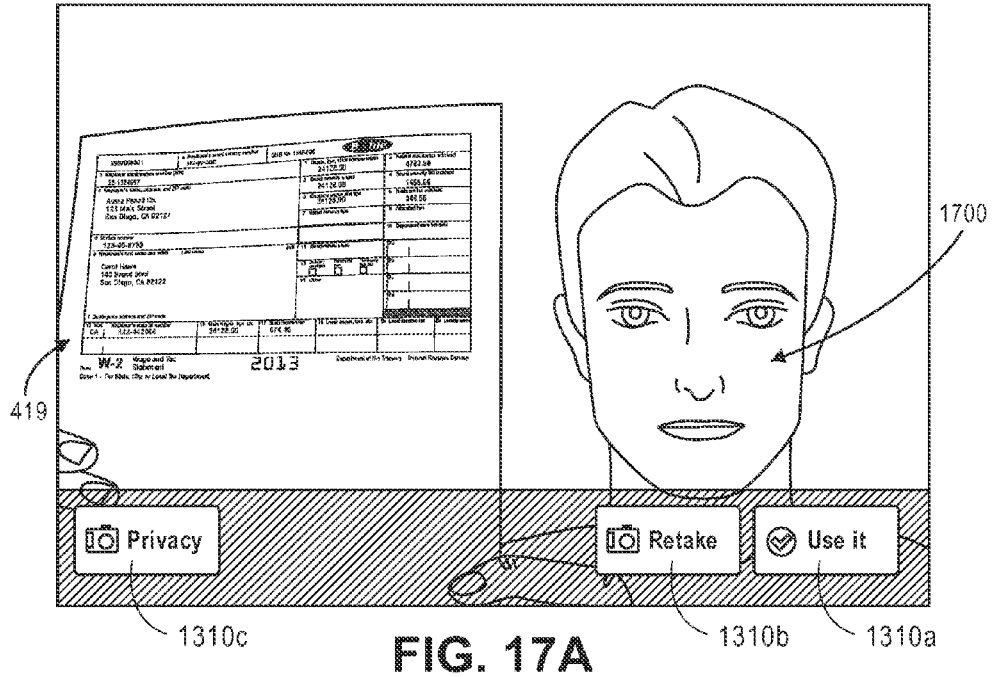
FIGS. 17A-D illustrate an example of how a portion of an image can be redacted before image processing according to one embodiment.
Figure 17B:
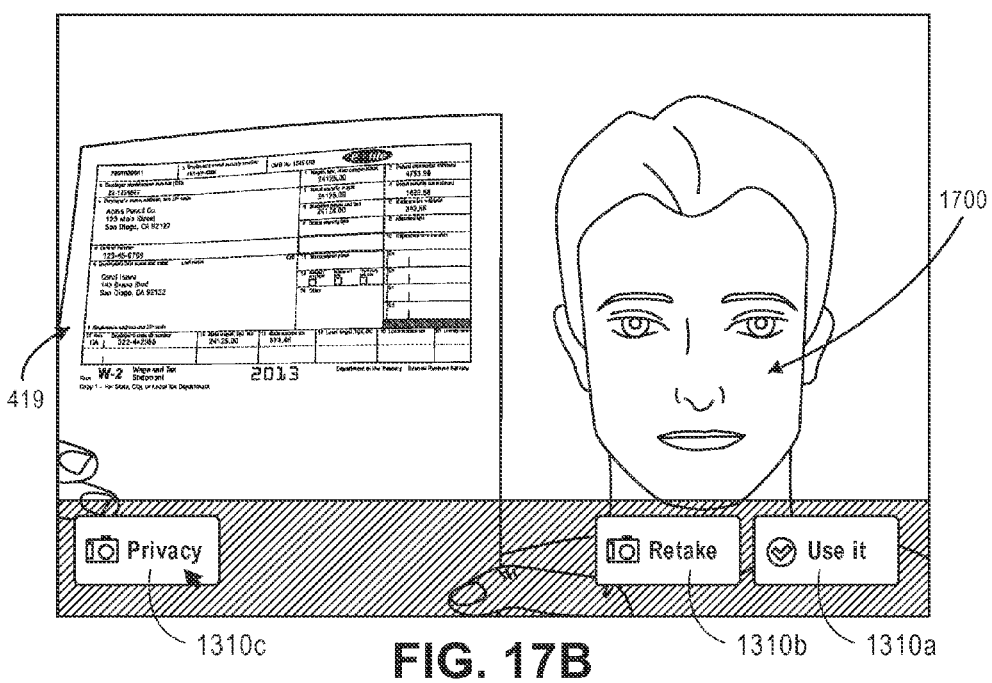

Referring to FIG. 16, at 1602, an image 419 acquired as discussed above and presented to the user 415 as described above and as shown in FIG. 17A includes an image of the tax document 430 and an image of the user's face 1700. As shown in FIG. 17A, the user interface generated by the document capture module 425 includes a "Privacy" button 1310c. At 1504, and as shown in FIG. 17B, the user 415 selects the "Privacy" button 1310c (by directing the mouse pointer to the "Privacy" button 1310c as shown), and presses the button to begin the redaction process.

Figure 17C:
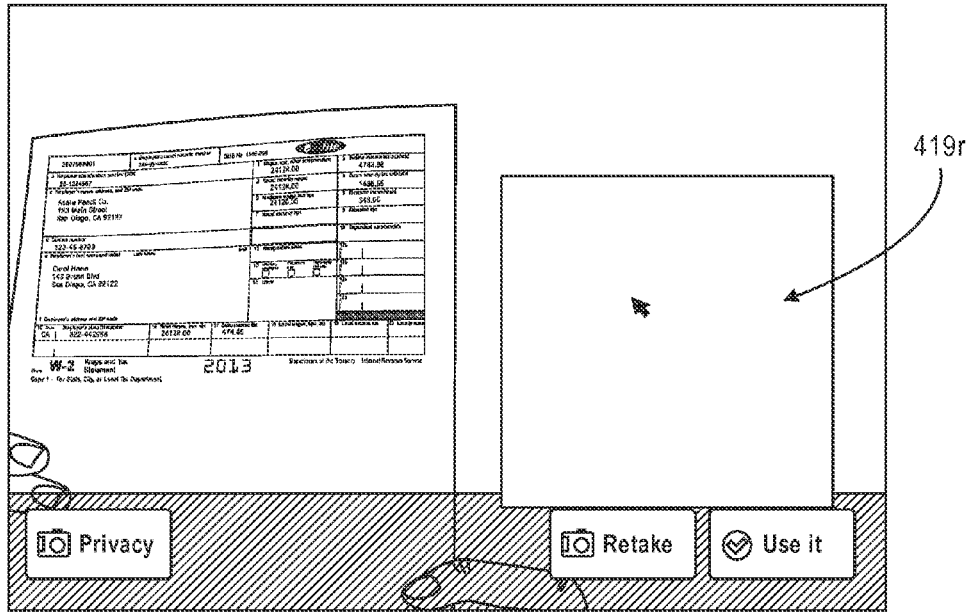
Figure 17D:
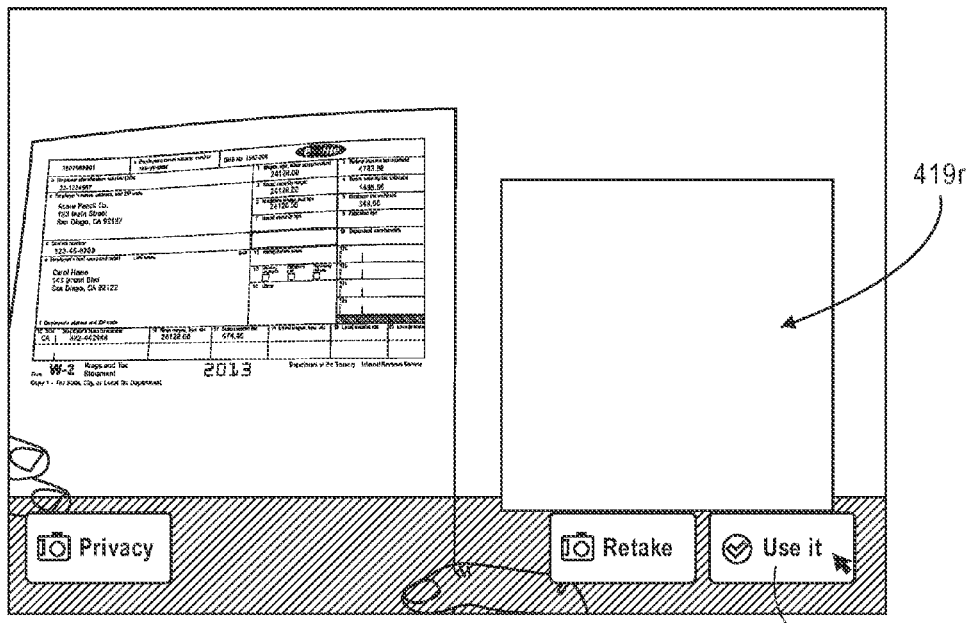

At 1506, and as shown in FIG. 17C, at least a portion of the acquired image 418 is masked or covered by the redaction module resulting in a redacted image 419r ("r" referring to "redacted" image). This may involve the redaction module 1510 performing facial recognition, detecting the user's face 1700 in the image 419 and masking or blocking the recognized face 1700. Or, in another embodiment, the user 415 may be allowed to manually select a portion of the image to be redacted, e.g., by cropping or selecting a box around the user's face 1700 as the portion of the image 419 to be redacted. At 1508, and as shown in FIGS. 17C-D, the acquired image 419 is transformed into a redacted image 419r in which, in the illustrated example, the recognized or selected portion including the user's face 1700 is masked, cropped or blocked. At 1510, assuming the user 415 does not want to retake the image and wants to use it, the user selects the "Use it" button 1310a, and the controller 510 proceeds with processing the redacted image 419r by providing the output of the redaction module 1510 to the image processor 580.

While the illustrated embodiment involves a redaction or privacy function for masking a user's face 1700 in the image 419, other aspects of the image 419 can also be redacted for other reasons. For example, the background of the image 419 may include other alpha-numeric text that the user 415 wants to delete from the image to avoid image processing 480 errors. Embodiments can be used to remove such extraneous data, whether or not it is private or personal data, in preparation for image processing 480. Further, embodiments may also be useful when the image 419 is to be transmitted over a network or processed by a third party that provides image processing 480 services so that more sensitive or private information, or information that the user 415 does not want to disclose or share, is not transmitted. Additionally, redaction embodiments can eliminate the need for repeating the image capture process since the image can be redacted after the image 419 has been acquired, thus eliminating the need to repeat the process if the user 415 did not expect or did not want the redacted information included in the image.

Having acquired the image 419, and retaking or generating a redacted image 419r as necessary, following satisfaction of the second pre-determined criteria 549, the user 415 eventually decides to use an image generated according to embodiments, and that image is provided as an input to an image processor 580.

Figure 18:
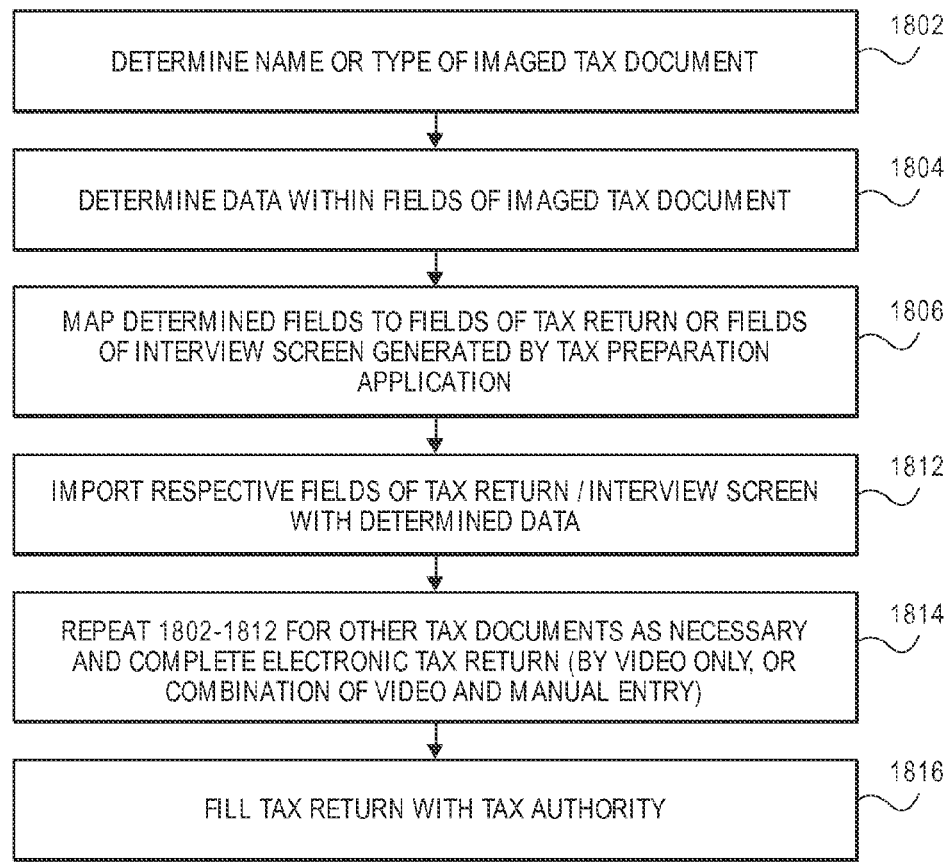
FIG. 18 illustrates an example of a method for processing an image acquired according to one embodiment.

Referring to again to FIG. 5 and with continuing reference to FIG. 18, an image processor 580, with the mapping element 570, can determine which tax document 430 has been imaged, perform optical character recognition (OCR) on the data 431 within the imaged tax document 430, and map data within fields of the imaged document to corresponding fields within the electronic tax return 422 or fields of interview screens generated by the tax return preparation application 420 used to populate electronic tax return fields.

More specifically, referring to FIG. 18, at 1802, the name or type of tax document 430 that is included in the image 419 is determined. This may be done by image processing 480 in the form of preliminary OCR, which identifies the tax document name (e.g., Form W-2, or 1099). Step 1802 may also involve identifying the type or name of the tax document 430 by performing a structure comparison with tax document templates 560 which, as described below, may also be used for mapping fields within the imaged tax document 419 to fields of the electronic tax return 422. For example, one or more attributes including the number of fields and field dimensions or coordinates within the imaged tax document 419 can be determined, and those structural features can be compared to structural features 562 of tax document templates 560 in the data store 520 to identify a match and identify the name or type of the tax document 430 that was imaged. At 1804, OCR 580 is utilized to determine the data 431 within the fields of the imaged tax document, and at 1806, fields in the imaged tax document are mapped to fields of the electronic tax return 422. For this purpose, a mapping summary may be stored in the data store 520 such that when the type or name of tax document 430 is known, the controller 510 can look up the tax document 430 in the mapping summary of the data store 520 to determine which fields within the imaged tax document correspond to fields of interview screens or of the electronic tax return 422. At 1808, recognized data in fields of the tax document image 419 are imported into respective fields of the interview screens or electronic tax return 422 based at least in part upon the mapping 470.

Further details of examples of how image processing 480 and mapping 490 may be performed are described in the following applications, all of which are commonly owned by Intuit Inc., and all of which are incorporated herein by reference as though set forth in full for all purposes: U.S. application Ser. No. 13/781,393 filed May 28, 2013, issued as U.S. Pat. No. 9,256,783 on Feb. 9, 2016, and entitled "Systems and Methods for Tax Data Capture and Use; PCT/US13/40628 filed on May 10, 2013, published as WIPO Publication No. WO 2014/133570 on Sep. 4, 2014; U.S. application Ser. No. 13/781,540 filed May 28, 2013 and entitled "Presentation of Image of Source of Tax Data Through Tax Preparation Application," PCT/US13/40647 filed on May 10, 2013, published as WIPO Publication No. WO 2014/133571 on Sep. 4, 2014; U.S. application Ser. No. 13/781,571 filed Feb. 28, 2013 and entitled "Tax Document Imaging and Processing," and PCT/US13/40620 filed on May 10, 2013, published as WIPO Publication No. WO 2014/133569 on Sep. 4, 2014.

At 1810, steps can be repeated for each tax document image 419 if multiple tax documents 430 were imaged, and an electronic tax return 422 is eventually completed. With embodiments, the electronic tax return 422 can be completed in a "touchless" manner or, in other words, in a manner that does not require the user 415 to manually enter tax return data by use of a keyboard or touchscreen of the computing device 410. For example, all of the electronic tax return data may be entered via motion-based video import according to embodiments only, or by using motion-based video import together with one or both of transfer from a prior year electronic tax return and importing data from an electronic file of a financial management system such as MINT, QUICKEN and QUICK-BOOKS financial management systems. Thus, while the use 415r may utilize a keyboard, touchscreen or mouse of the computing device 410 to initiate or request imports or transfers, the user 415 is not required to actually enter tax return data manually such that embodiments provide for "touchless" tax return preparation based at least in part upon motion-based video import according to embodiments. After the electronic tax return 422 has been completed, the completed electronic tax return 522 can be filed with the tax authority computer 450, and for this purpose, the intermediate computer 440 can process the electronic tax return 422 for filing with the tax authority computer 450.

Figure 19:
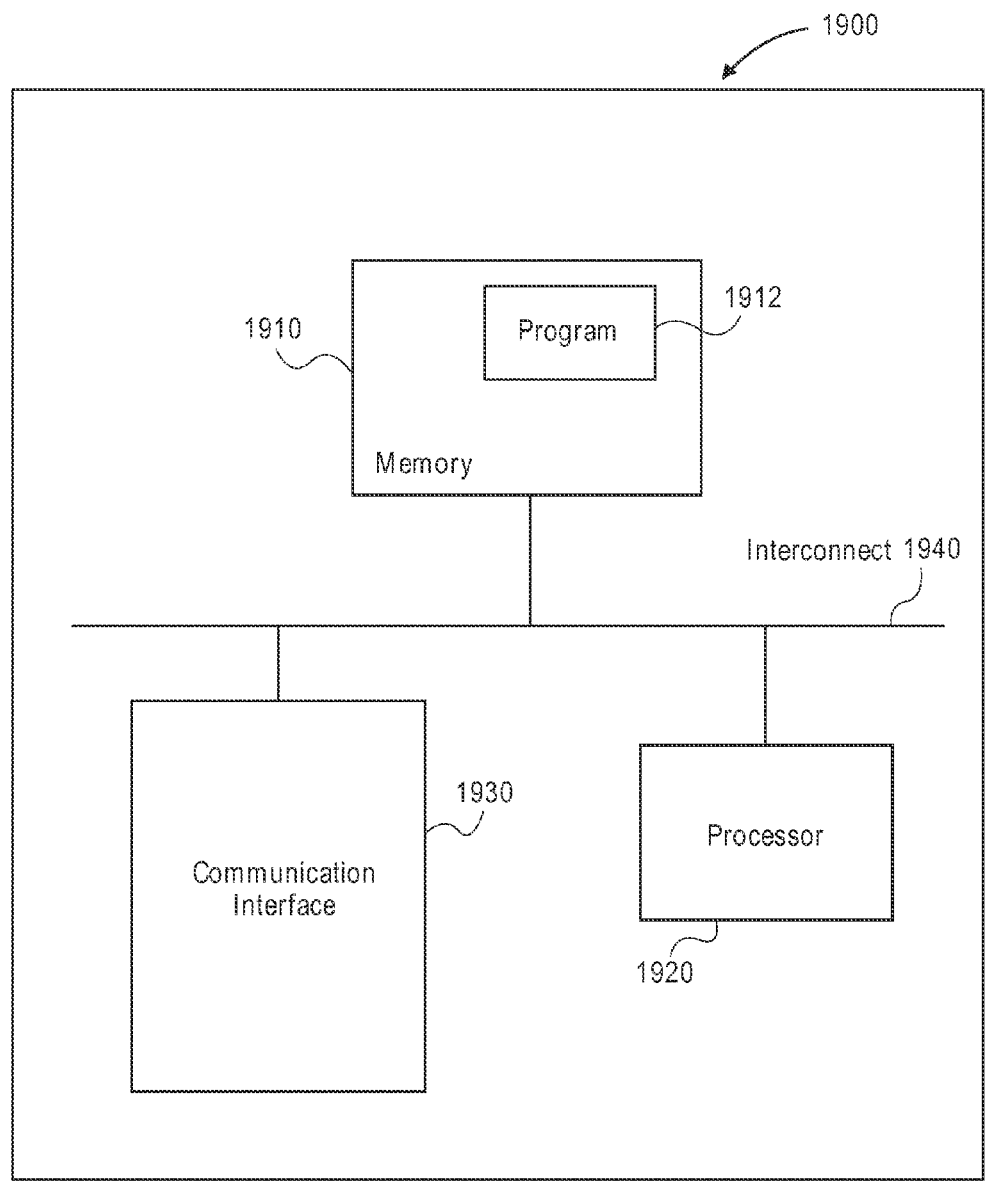
FIG. 19 is a block diagram of components of a computing apparatus or system in which various embodiments may be implemented or that may be utilized to execute various embodiments.

FIG. 19 generally illustrates components of a computing device 3700 that may be utilized to execute embodiments and that includes a memory 1910, account processing program instructions 1912, a processor or controller 1920 to execute account processing program instructions 1912, a network or communications interface 1930, e.g., for communications with a network or interconnect 1940 between such components. The memory 1910 may be or include one or more of cache, RAM, ROM, SRAM, DRAM, RDRAM, EEPROM and other types of volatile or non-volatile memory capable of storing data. The processor unit 1920 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1940 may include a system bus, LDT, PCI, ISA, or other types of buses, and the communications or network interface may, for example, be an Ethernet interface, a Frame Relay interface, or other interface. The network interface 1930 may be configured to enable a system component to communicate with other system components across a network which may be a wireless or various other networks. It should be noted that one or more components of computing device 1900 may be located remotely and accessed via a network. Accordingly, the system configuration provided in FIG. 19 is provided to generally illustrate how embodiments may be configured and implemented.

Method embodiments may also be embodied in, or readable from, a computer program product or article of manufacture comprising a non-transitory computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1920 performs steps or executes program instructions 1912 within memory 1910 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, it will be understood that embodiments may be implemented within or executed by a desktop or on-line version of a tax preparation application, or as a native or downloadable application executable on a mobile communication device such as a smartphone or tablet computing or communication device.

Further, while embodiments have been described with reference to processing images of tax documents for purposes of preparing an electronic tax return utilizing a tax preparation application, embodiments may also be utilized with or executed by other financial management systems to image and process images of other types of documents. For example, other embodiments may involve other financial management systems utilized to analyze images of financial documents containing account and/or transaction data in connection with management of personal finances of the user of the financial management system.

Additionally, it will be understood that certain embodiments may be utilized independently of or in conjunction with each other.

Moreover, while certain embodiments have been described with reference to method steps performed in an exemplary order, it will be understood that various steps may be performed in different orders and/or concurrently. Flow diagrams are provided as non-limiting examples of how embodiments may be implemented.

Accordingly, embodiments are intended to exemplify alternatives, modifications, and equivalents that may fall within the scope of the claims.

What is claimed is:

1. A computer implemented method for determining data of a tax document, the method being performed by a computing device and comprising:

the computing device acquiring a video utilizing a video camera and detecting a first motion of the tax document in the video, wherein the computing device is prompted by a user of the computing device for acquisition of an image of the tax document based at least in part upon the detected first motion satisfying first pre-determined criteria;

the computing device detecting a second motion of the tax document in the video;

the computing device acquiring an image of the tax document based at least in part upon the detected second motion satisfying second pre-determined criteria different from the first pre-determined criteria; and the computing device processing the acquired image to extract data of the tax document from the acquired image.

2. The computer-implemented method of claim 1, detecting the first motion comprising the computing device analyzing frames or groups of frames of the video by identifying respective positions of the tax document within respective frames; and detecting the first motion of the tax document based at least in part upon respective different detected positions of respective tax document images in respective frames.

3. The computer-implemented method of claim 1, the first pre-determined criteria comprising a minimum motion of the tax document.

4. The computer-implemented method of claim 1, detecting the first motion and detecting the second motion being based at least in part upon respective optical flows representative of respective positions and apparent motions of the tax document within respective frames of the video.

5. The computer-implemented method of claim 4, the computing device comparing data of at least one attribute of a first optical flow and a first pre-determined value to determine whether the first pre-determined criteria is satisfied, and comparing data of at least one attribute of a second optical flow and a second pre-determined value to determine whether the second pre-determined criteria is satisfied.

6. The computer-implemented method of claim 4, the computing device determining respective optical flows based at least in part upon a common optical flow estimator.

7. The computer-implemented method of claim 6, wherein the optical flow estimator is a Lucas-Kanade optical flow estimator.

8. The computer-implemented method of claim 1, the first pre-determined criteria being satisfied based at least in part upon sufficient shaking or movement of the tax document in view of the video camera, and the second pre-determined criteria being satisfied based at least in part upon the shaking or movement that satisfied the first pre-determined criteria ceasing or being reduced to a level to allow data of the imaged tax document to be recognized by computer vision.

9. The computer-implemented method of claim 1, the second pre-determined criteria being satisfied when the tax document is steady or substantially steady in view of the video camera.

10. The computer-implemented method of claim 9, the second pre-determined criteria being satisfied when the tax document is steady or substantially steady for a pre-determined minimum time.

11. The computer-implemented method of claim 10, further comprising the computing device executing a timer to count to the pre-determined minimum time.

12. The computer-implemented method of claim 11, further comprising the computing device displaying the timer count to the user to indicate to the user how long the user should hold the tax document steady or substantially steady.

13. The computer-implemented method of claim 11, further comprising the computing device analyzing the video after the second pre-determined criteria has been satisfied to determine whether the second pre-determined criteria continues to be satisfied for the duration of the timer count.

14. The computer-implemented method of claim 13, wherein when the second pre-determined criteria is satisfied for a duration of the timer count, the computing device proceeds to acquire the image of the tax document after the pre-determined minimum time, else interrupting or terminating acquisition of the image of the tax document until the computing device detects that the tax document is steady or substantially steady for the pre-determined minimum time.

15. The computer-implemented method of claim 14, wherein when acquisition of the image of the tax document has been interrupted or delayed, the computing device generating a message instructing the user to hold the tax document steady and presenting the message to the user through the computing device.

16. The computer-implemented method of claim 1, detecting the second motion comprising the computing device analyzing subsequent frames or groups of frames of the video after the first pre-determined criteria has been satisfied by
identifying respective subsequent positions of the tax document within respective subsequent frames; and
detecting the second motion of the tax document based at least in part upon respective different detected positions of respective tax document images in respective subsequent frames.

17. The computer-implemented method of claim 16, the second pre-determined criteria being satisfied when detected subsequent positions indicate that the tax document is steady or substantially steady in view of the video camera.

18. The computer-implemented method of claim 1, wherein the computing device is prompted to acquire the image in response to the user shaking the tax document in view of the video camera, and the computing device acquires the image when the user stops shaking or moving the tax document for a pre-determined minimum time.

19. The computer-implemented method of claim 18, before the first pre-determined criteria is satisfied, further comprising the computing device prompting the user to shake or move the tax document in view of the video camera.

20. The computer-implemented method of claim 1, further comprising the computing device presenting a notification to the user of the computing device that the computing device has been prompted to acquire an image of the tax document.

21. The computer-implemented method of claim 20, the notification comprising an audible indicator.

22. The computer-implemented method of claim 20, the notification being presented to the user while the user's view of a display screen of the computing device is obstructed by the tax document being held in view of the video camera.

23. The computer-implemented method of claim 1, the video being generated by the video camera comprising a webcam integrated within a display of a desktop or a laptop computer.

24. The computer-implemented method of claim 1, the video being generated by the video camera comprising a video camera integrated within or in communication with the computing device.

25. The computer-implemented method of claim 1, the first motion and the second motion being based at least in part upon relative motion of the computing device and the tax document while the computing device is stationary.

26. The computer-implemented method of claim 1, the first motion and the second motion being based at least in part upon relative motions of the computing device and the tax document while the tax document is stationary and the computing device is moved by the user relative to the stationary tax document.

27. The computer-implemented method of claim 1, the first motion and the second motion being based at least in part upon relative motions of the computing device and the tax document while the tax document is held by the user in a first hand and the computing device including the video camera is held by the user in a second hand.

28. The computer-implemented method of claim 1, further comprising, the computing device determining whether an object positioned in view of the video camera is a tax document.

29. The computer-implemented method of claim 28, determining whether the object is the tax document being based at least in part upon a Hough transform.

30. The computer-implemented method of claim 28, determining whether the object is the tax document being based at least in part upon at least one of a color and a dimension of the object.

31. The computer-implemented method of claim 28, determining whether the object is the tax document being based at least in part upon detecting a field structure within the object.

32. The computer-implemented method of claim 28, wherein when the object is not determined to be the tax document, the computing device is not prompted to acquire the image.

33. The computer-implemented method of claim 28, wherein when an object other than a tax document is placed in view of the video camera, the computing device is not prompted to acquire an image of the object.

34. The computer-implemented method of claim 28, wherein determining whether the object is a tax document performed before determining whether the first pre-determined criteria is satisfied.

35. The computer-implemented method of claim 1, wherein the acquired image comprises a face of the user, the method further comprising the computing device:
  recognizing the face of the user within the acquired image; and
  generating a redacted image by masking or cropping the face from the image, wherein the redacted image is processed to extract data of the tax document.

36. The computer-implemented method of claim 1, wherein the acquired image comprises a face of the user, the method further comprising the computing device:
  receiving user input selecting the user's face within the acquired image; and
  generating a redacted image by masking or cropping the face from the image, wherein the redacted image is processed to extract data of the tax document.

37. The computer-implemented method of claim 1, wherein the video and the image are acquired by the video camera.

38. The computer-implemented method of claim 37, wherein the image of the tax document is captured by the video camera while the video is being recorded by the video camera.

39. The computer-implemented method of claim 37, wherein the image is a frame of the video.

40. The computer-implemented method of claim 1, wherein the image of the tax document is captured by an imaging component of or utilized by the computing device independently of the video camera.

41. The computer-implemented method of claim 1, processing the acquired image comprising the computing device:
  determining a name or type of the tax document within the image, a field structure of the tax document and data within respective fields;
  mapping respective fields of the tax document within the image to respective fields of an electronic tax return prepared by a tax return preparation application executed by the computing device; and
  importing determined data from respective fields of tax document in the image to into respective fields of the electronic tax return based at least in part upon the mapping.

42. The computer-implemented method of claim 41, further comprising the computing device electronically filing the electronic tax return with a computer of a tax authority on behalf of the user or transmitting the electronic tax return to an intermediate, electronic filing server for electronic filing of the completed electronic tax return with the tax authority computer.

43. The computer-implemented method of claim 41, wherein the electronic return is prepared and completed by the user holding at least one tax document in view of the video camera without the user manually inputting tax return data by a keyboard or touchscreen of the computing device.

44. The computer-implemented method of claim 41, determining the name or type of the tax document comprising the computing device
  determining a field structure of the tax document in the image;
  performing a comparison of the determined field structure and tax document templates;
  selecting a tax document template based at least in part upon the comparison; and
  determining the name or type of the tax document based at least in part upon the selected tax document template.

45. The computer-implemented method of claim 41, further comprising the computing device:
  receiving user input through a touchscreen or keyboard of the computing device; and
  populating at least one field of the electronic tax return based at least in part upon the received user input, wherein the electronic tax return is completed based at least in part upon the received user input and imported determined data, and
  electronically filing the completed electronic tax return with a computer of a tax authority on behalf of the user.

46. A computer implemented method for determining data of a tax document, the method being performed by a computing device and comprising:
  the computing device acquiring a video of an object held by a user of the computing device in front of a video camera of the computing device;
  the computing device determining whether the object is a tax document, and
  when the computing device determines that the object is a tax document, the computing device acquiring a video utilizing a video camera and detecting a first motion of the tax document in the video, detecting the first motion comprising shaking or movement of the tax document by the user in the video, wherein the computing device is prompted by the user for acquisition of an image of the tax document based at least in part upon the detected shaking or movement satisfying first pre-determined criteria, detecting a second motion comprising the tax document being maintained substantially steady; acquiring an image of the tax document after the tax document is maintained substantially steady for a pre-determined minimum time and processing the acquired image to extract data of the tax document from the acquired image.

47. The computer-implemented method of claim 46, wherein the acquired image comprises a face of the user, the method further comprising the computing device:
  recognizing the face of the user within the acquired image; and
  generating a redacted image by masking or cropping the face from the image, wherein the redacted image is processed to extract data of the tax document.

48. The computer-implemented method of claim 46, wherein the acquired image comprises a face of the user, the method further comprising the computing device:
  receiving user input selecting the user's face within the acquired image; and
  generating a redacted image by masking or cropping the face from the image, wherein the redacted image is processed to extract data of the tax document.

49. A computer implemented method for preparing an electronic tax return, the method being performed by a computing device executing a tax return preparation application operable to prepare the electronic tax return, the method comprising:
  the computing device acquiring a video utilizing a video camera and detecting a first motion of the tax document in the video satisfying first pre-determined criteria;
  the computing device detecting a second motion of the tax document in the video and acquiring an image of the tax document based at least in part upon the detected second motion satisfying second pre-determined criteria different from the first pre-determined criteria; and
  the computing device processing the acquired image to extract data of the tax document from the acquired image and import extracted data into the electronic tax return, wherein the electronic tax return is completed without the user manually input electronic tax return data into a touchscreen or keyboard of the computing device.

50. A computer implemented method for video-based preparation of an electronic tax return, the method being performed by a computing device executing a tax return preparation application operable to prepare the electronic tax return, the method comprising the computing device:

the computing device acquiring a video of a plurality of tax documents utilizing a video camera;

the computing device acquiring an image of each of the plurality of tax documents in respective to respective movements of respective tax documents by the user in view of the video camera;

the computing device processing the images to extract respective tax document data from respective images and determine respective fields of the electronic tax return that should be populated with extracted data;

the computing device importing respective extracted data into respective fields of the electronic tax return, wherein the electronic tax return is completed using respective tax document data extracted from respective images without the user manually inputting any electronic tax return data into the electronic tax return data.

51. A computer implemented method for video-based preparation of an electronic tax return, the method being performed by a computing device executing a tax return preparation application operable to prepare the electronic tax return, the method comprising:

the computing device extracting data from an image of a tax document acquired by the computing device in response to the computing device detecting a motion of the tax document in a video acquired by a video camera of the computing device; and the computing device importing respective extracted data into respective fields of the electronic tax return.

* * * * *